(12) United States Patent
Kristoffersen et al.

(10) Patent No.: US 11,461,429 B1
(45) Date of Patent: Oct. 4, 2022

(54) SYSTEMS AND METHODS FOR WEBSITE SEGMENTATION AND QUALITY ANALYSIS

(71) Applicant: Siteimprove A/S, Copenhagen (DK)

(72) Inventors: Kristian Kristoffersen, Kastrup (DK); Jannick Johnsen, Copenhagen (DK); Søren Jacobsen, Copenhagen (DK)

(73) Assignee: Siteimprove A/S

( * ) Notice: Subject to any disclaimer, the term of this patent is extended or adjusted under 35 U.S.C. 154(b) by 0 days.

(21) Appl. No.: 17/590,562

(22) Filed: Feb. 1, 2022

Related U.S. Application Data

(60) Provisional application No. 63/277,948, filed on Nov. 10, 2021.

(51) Int. Cl.
| | |
|---|---|
| *G06F 7/02* | (2006.01) |
| *G06F 16/00* | (2019.01) |
| *G06F 16/957* | (2019.01) |
| *H04L 67/02* | (2022.01) |
| *G06F 3/04842* | (2022.01) |
| *G06F 16/951* | (2019.01) |
| *G06F 11/36* | (2006.01) |

(52) U.S. Cl.
CPC ...... *G06F 16/9574* (2019.01); *G06F 3/04842* (2013.01); *G06F 16/951* (2019.01); *H04L 67/02* (2013.01); *G06F 11/3664* (2013.01); *G06F 16/957* (2019.01)

(58) Field of Classification Search
CPC .............. G06F 16/9574; G06F 16/951; G06F 3/04842; G06F 16/957; G06F 8/70; G06F 11/3604; G06F 11/3664; G06F 11/3668; H04L 67/02
See application file for complete search history.

(56) References Cited

U.S. PATENT DOCUMENTS

| | | | |
|---|---|---|---|
| 836,414 | A | 11/1906 | Toles |
| 6,360,235 | B1 | 3/2002 | Tilt |
| (Continued) | | | |

FOREIGN PATENT DOCUMENTS

WO   WO 2012/027022   3/2012

OTHER PUBLICATIONS

EP Supplementary Search Report in European Application No. EP18853482, dated Mar. 29, 2020, 9 pages.

(Continued)

*Primary Examiner* — Bruce M Moser
(74) *Attorney, Agent, or Firm* — Fish & Richardson P.C.

(57) ABSTRACT

Described herein are systems and methods for assessing website quality based on automated website analysis. A method can include identifying, by a computing system, a website to evaluate, retrieving code for webpages of the website from one or more web server systems that host the website, locally executing and interpreting the code to render the webpages as they would appear on client devices, identifying webpage segment criteria, analyzing the webpages to identify a subset of webpages that include a segment satisfying the webpage segment criteria, identifying a quality issue in the segment that is present in each webpage in the subset, determining a quantity of times the quality issue occurs across the subset of webpages, and providing information to a client device to cause the client device to present an indication of the issue and an indication of the quantity of times the issue occurs across the subset of webpages.

25 Claims, 15 Drawing Sheets

(56) References Cited

U.S. PATENT DOCUMENTS

| | | | |
|---|---|---|---|
| 7,231,606 | B2 | 6/2007 | Miller et al. |
| 7,475,067 | B2 | 1/2009 | Clary et al. |
| 7,558,795 | B2 | 7/2009 | Malik et al. |
| 7,584,435 | B2 | 9/2009 | Bailey et al. |
| 7,797,200 | B2 | 9/2010 | Patrawala |
| 7,805,428 | B2 | 9/2010 | Batista Reyes et al. |
| 8,065,410 | B1 | 11/2011 | Breen et al. |
| 8,196,104 | B2 | 6/2012 | Cohrs et al. |
| 8,447,751 | B2 | 5/2013 | Stouffer et al. |
| 8,533,684 | B2 | 9/2013 | Brunet et al. |
| 8,554,698 | B2 | 10/2013 | Bando et al. |
| 8,613,039 | B2 | 12/2013 | Chen et al. |
| 8,972,379 | B1 | 3/2015 | Grieselhuber et al. |
| 9,009,784 | B2 | 4/2015 | Chen et al. |
| 9,087,035 | B1 | 7/2015 | Bandaru et al. |
| 9,152,729 | B2 | 10/2015 | Ajoku et al. |
| 9,537,732 | B2 | 1/2017 | Mukherjee et al. |
| 9,563,422 | B2 | 2/2017 | Cragun et al. |
| 10,114,902 | B2 | 10/2018 | Byakod et al. |
| 10,169,188 | B2 | 1/2019 | Belekar et al. |
| 10,534,512 | B2 | 1/2020 | Jadhav et al. |
| 10,706,122 | B2 | 7/2020 | Sabbavarpu |
| 10,831,831 | B2 | 11/2020 | Greene |
| 10,860,594 | B2 | 12/2020 | Jamshidi |
| 10,963,470 | B2 | 3/2021 | Jamshidi |
| 10,970,294 | B2 | 4/2021 | Jamshidi |
| 11,113,276 | B2 | 9/2021 | Zhao |
| 11,262,979 | B2 | 3/2022 | Deshmukh et al. |
| 2004/0039734 | A1 | 2/2004 | Judd et al. |
| 2006/0253345 | A1 | 11/2006 | Herber |
| 2008/0133500 | A1 | 6/2008 | Edwards |
| 2009/0113287 | A1 | 4/2009 | Yee |
| 2010/0042608 | A1 | 2/2010 | Kane |
| 2012/0010927 | A1 | 1/2012 | Attenberg et al. |
| 2012/0017281 | A1 | 1/2012 | Bannerjee et al. |
| 2012/0047120 | A1 | 2/2012 | Connolly |
| 2012/0254405 | A1 | 10/2012 | Ganesh et al. |
| 2012/0254723 | A1 | 10/2012 | Kasa et al. |
| 2013/0282691 | A1 | 10/2013 | Stouffer et al. |
| 2014/0164345 | A1 | 6/2014 | Connolly et al. |
| 2014/0304578 | A1 | 10/2014 | Parkinson et al. |
| 2015/0039746 | A1 | 2/2015 | Mukherjee et al. |
| 2015/0317132 | A1 | 11/2015 | Rempell et al. |
| 2015/0348071 | A1 | 12/2015 | Cochrane et al. |
| 2016/0055490 | A1 | 2/2016 | Keren et al. |
| 2016/0210360 | A9 | 7/2016 | Stouffer et al. |
| 2016/0353148 | A1 | 12/2016 | Prins et al. |
| 2018/0210965 | A1 | 7/2018 | Grigoryan et al. |
| 2019/0073365 | A1 | 3/2019 | Jamshidi |
| 2020/0151187 | A1 | 5/2020 | Jamshidi |
| 2020/0394200 | A1 | 12/2020 | Jamshidi |
| 2021/0081165 | A1* | 3/2021 | Deshmukh ............. G06F 3/167 |
| 2021/0326348 | A1 | 10/2021 | Jamshidi |

OTHER PUBLICATIONS

Gustafsdottir [online], "CMS Plugin: Frequently Asked Questions," Siteimprove.com, Jul. 9, 2020, 3 pages.

Gustafsdottir [online], "How to navigate the Siteimprove CMS Plugin," Siteimprove.com, Sep. 10, 2020, 7 pages.

International Preliminary Report on Patentability in PCT Appln. No. PCT/US2018/049809, dated Mar. 10, 2020, 13 pages.

International Search Report and Written Opinion in Application No. PCT/US2018/049809, dated Nov. 19, 2018, 13 pages.

Kamal, "Evaluating web accessibility metrics for Jordanian Universities," International Journal of Advanced Computer Science and Applications, 2016, 7(7): 113-122.

Needham [online], "CMS Plugin: Security FAQ," Siteimprove.com, Aug. 9, 2020, 2 pages.

Needham [online], "On which CMS is the Siteimprove plugin available?," Siteimprove.com, May 7, 2020, 11 pages.

Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.

Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.

Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.

Siteimprove.com [online], "Adobe Experience Manager: Siteimprove provided plugin," available on or before Aug. 12, 2020, via Internet Archive: Wayback Machine URL <https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.

Siteimprove.com [online], "Adobe Experience Manager: Siteimprove provided plugin," available on or before Sep. 20, 2020, via Internet Archive: Wayback Machine URL <https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.

Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.

Siteimprove.com [online], "Drupal," available on or before Aug. 12, 2020, via Internet Archive: Wayback Machine URL <https://web.archive.org/web/20200812071254/https :/siteimprove.com/en/core-platform/integrations/cms-plugin/drupal/>, retrieved on Mar. 21, 2022, URL<https://siteimprove.com/en/core-platform/integrations/cms-plugin/dmpal/>, 12 pages.

Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01F0GCPTWX5H3ZS558V1GVEQQN>, 3 pages.

Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.

Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.

Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.

Siteimprove.com [online], "Oct. & Nov. 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.

Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.

Siteimprove.com [online], "Optimizely + Siteimprove," available on or before Jun. 16, 2021, via Internet Archive: Wayback Machine URL <https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.

Siteimprove.com [online], "Siteimprove CMS Plugin Integration Cookbook," available on or before Aug. 5, 2020, via Internet Archive: Wayback Machine URL <https://web.archive.org/web/20200805195514/https://developer.siteimprove.com/cms-plugin-integration-cookbook/>, retrieved on Mar. 21, 2022, URL<https://developer.siteimprove.com/cms-plugin-integration-cookbook/>, 13 pages.

Siteimprove.com [online], "Web accessibility for all with the next generation of Siteimprove Accessibility," Mar. 20, 2020, retrieved

(56) References Cited

OTHER PUBLICATIONS on Mar. 21, 2022, retrieved from URL<https://siteimprove.com/en-us/blog/web-accessibility-for-all-with-next-generation-siteimprove-accessibility/>, 36 pages.

Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.

Zhou, "Evaluating Websites Using a Practical Quality Model", Software Technology Research Laboratory, De Montfort University, 2009, 113 pages.

* cited by examiner

FIG. 9

SYSTEMS AND METHODS FOR WEBSITE SEGMENTATION AND QUALITY ANALYSIS

REFERENCE TO CO-PENDING APPLICATION

This application claims the benefit of priority under 35 U.S.C. § 119(e) to U.S. Provisional Patent Application No. 63/277,948, filed Nov. 10, 2021 and entitled SYSTEMS AND METHODS FOR WEBSITE SEGMENTATION AND QUALITY ANALYSIS, and the entire disclosure set forth therein is incorporated herein by reference.

TECHNICAL FIELD

This document describes devices, systems, and methods related to assessing website quality, particularly with regards to segmenting a website based on similarity of elements in webpages of the website.

BACKGROUND

Websites can vary in their quality. The quality of a website can affect user experience of users who visit the website. For example, websites with broken links, misspellings, and other features that do not function as intended can be frustrating for users visiting a site. Additionally, websites that are not optimized for search engines (also referred to as "search engine optimization" or SEO) may have a low level of quality because users may not be able to locate relevant pages on the website (or locate the website more generally) using a search engine. For example, websites that do not have information formatted properly for search engines to retrieve and associate with other information on the page may have low levels of SEO, which may result in those websites not appearing as prominently in search results as they otherwise should for relevant search strings. Websites can also have a low level of quality if they are not readily accessible to all users regardless of impairment (also referred to as "website accessibility"). For example, if a website is not formatted properly, users who are seeing or hearing impaired may not be able to use website reader applications to review and navigate through the content.

SUMMARY

The document generally relates to assessing quality of a website, particularly with regards to identifying and addressing issues in segments across webpages of the website. A website owner, or client, can have many webpages that make up their website. Sometimes, it can be challenging to identify and target which webpages to fix. Moreover, some webpages can have the same or similar issues. Fixing the same or similar issues can be a tedious and repetitive task. The disclosed techniques, on the other hand, can provide for automatically determining different contextual segments in webpages of a website and dynamically assessing issues in the same segments across the website. As a result, the website owner can address an issue that repeats in a same segment across multiple webpages to quickly fix those webpages, improve an overall quality score of the website, and improve user experiences for users who visit the website. The disclosed techniques can also provide for a variety of interface extensions, such as filtering different website assessments based on segments.

Segment criteria can be generated and used by a web analysis server system to identify segments in webpages of the website. Although referred to as segments throughout this disclosure, segments are synonymous with, and can also be referred to as, sections. Multiple distinct criteria can be used to identify corresponding segments such as content headers, footers, menus, content areas, metadata, etc. in a webpage. In some implementations, machine learning trained models can be used by the web analysis server system to identify segments in the webpages. The web analysis server system can identify all webpages as having the same segment(s) based on whether the webpages satisfy the criteria. The web analysis server system can then generate output to be presented in a graphical user interface (GUI) display at a client computing device of the website owner or another relevant user that includes indications of the webpages having the same segment(s), one or more issues associated with each of those webpages, quality scores of the webpages, and/or other information about the webpages having the same segment(s). The website owner can use the output presented in the GUI display to prioritize and efficiently review webpages, and their associated issues, to improve overall quality of the website and user experiences for users who visit the website.

Although the disclosed inventive concepts include those defined in the attached claims, it should be understood that the inventive concepts can also be defined in accordance with the following embodiments.

Embodiment 1 is a method for assessing website quality based on automated website analysis, the method comprising: identifying, by a computing system, a website to evaluate, wherein the website comprises webpages and the website is associated with a user account; retrieving, by the computing system, code for the webpages that the website comprises from one or more web server systems that host the website; locally executing and interpreting, by the computing system, the code to render the webpages as they would appear on client computing devices; identifying, by the computing system, webpage segment criteria; analyzing, by the computing system, the webpages to identify a subset of webpages that include a segment that satisfies the webpage segment criteria, the segment comprising webpage code; identifying, by the computing system, a quality issue in the segment that is present in each webpage in the subset of webpages; determining, by the computing system, a quantity of times that the quality issue occurs across the subset of webpages; and providing, by the computing system, information to a client computing device associated with the user account to cause the client computing device to present an indication of the issue and an indication of the quantity of times that the issue occurs across the subset of webpages.

Embodiment 2 is the method of embodiment 1, wherein each webpage of the website comprises multiple segments identified by the computing system based on the webpage segment criteria.

Embodiment 3 is the method of any one of embodiments 1 through 2, wherein each webpage of the website comprises multiple types of segments.

Embodiment 4 is the method of any one of embodiments 1 through 3, further comprising analyzing, by the computing system, the webpages of the website to identify a second subset of webpages that include a second segment that is different from the first segment and that satisfies second webpage segment criteria, the second subset of webpages being different from the subset of web pages; and identifying, by the computing system, a second quality issue in the second segment that is present in each webpage in the second subset of webpages.

Embodiment 5 is the method of any one of embodiments 1 through 4, further comprising providing, by the computing system, information to the client computing device to cause the client computing device to present a selectable option to filter a presentation of issues present across webpages of the website to a subset of issues that are specific to one or more user-selected categories of segments, from among a collection of user-selectable categories of segments.

Embodiment 6 is the method of any one of embodiments 1 through 5, wherein the collection of user-selectable categories of segments includes a headers category, a footers category, and a metadata category.

Embodiment 7 is the method of any one of embodiments 1 through 6, further comprising receiving, by the computing system, an indication that the client computing device received user input that interacted with the selectable option to select multiple categories of the collection of user-selectable categories of segments.

Embodiment 8 is the method of any one of embodiments 1 through 7, further comprising: receiving, by the computing system, an indication that the client computing device received user input that interacted with the selectable option to select a user-selected category of the collection of user-selectable categories of segments; and providing, by the computing system responsive to receiving the indication that the client computing device received the user input that interacted with the selectable option to select the user-selected category, information to the client computing device to cause the client computing device to change a user interface of the client computing device from (i) presenting indications of quality issues that are relevant to all webpages of the website, to (ii) presenting only indications of quality issues that are relevant to webpages that include any segment from the user-selected category.

Embodiment 9 is the method of any one of embodiments 1 through 8, further comprising: receiving, by the computing system, an indication that the client computing device received user input that interacted with the selectable option to select, in addition to the user-selected category, a second user-selected category of the collection of user-selectable categories of segments; and providing, by the computing system responsive to receiving the indication that the client computing device received the user input that interacted with the selectable option to select the second user-selected category, information to the client computing device to cause the client computing device to change the user interface of the client computing device from (i) presenting only indications of quality issues that are relevant to webpages that include any segment from the user-selected category, to (ii) presenting only indications of quality issues that are relevant to webpages that include segments within the user-selected category and indications of quality issues that are relevant to webpages that include segments within the second user-selected category.

Embodiment 10 is the method of any one of embodiments 1 through 9, wherein: the segments within the user-selected category are present across a first subset of webpages of the website; the segments within the second user-selected category are present across a second subset of webpages of the website; and the first subset of webpages is different from the second subset of webpages.

Embodiment 11 is the method of any one of embodiments 1 through 10, wherein the second user-selected category of segments represents content of the webpages of the website that is not specified by webpage segment criteria and that is other than the segments of the user-selected category of segments.

Embodiment 12 is the method of any one of embodiments 1 through 11, further comprising providing, by the computing system, information to the client computing device to cause the client computing device to display a graphical user interface (GUI) that presents (i) a particular webpage of the website concurrently with (ii) indications of multiple segments present across the webpages of the website.

Embodiment 13 is the method of any one of embodiments 1 through 12, further comprising: receiving, by the computing system, an indication that the client computing device received user input that interacted with the presentation of the indications of the multiple segments to indicate selection of a user-selected segment of the multiple segments; and providing, by the computing system, information to the client computing device to cause the client computing device to highlight, in the GUI that presents the particular webpage concurrently with the indications of the multiple segments, a portion of the webpage that corresponds to the user-selected segment of the multiple segments.

Embodiment 14 is the method of any one of embodiments 1 through 13, wherein the GUI includes a side panel that is adjacent to the presentation of the particular webpage in the GUI, wherein the side panel includes the indications of the multiple segments present across the webpages of the website and selectable options to generate the webpage segment criteria.

Embodiment 15 is the method of any one of embodiments 1 through 14, wherein: the indications of the multiple segments that are presented as part of the side panel represents segments present across webpages of the website; and the computing system has identified the particular webpage as including a group of segments that is less than all of the segments present across the webpages of the website, such that some of the segments represented by the indications of the multiple segments that are visually shown in the side panel are not present in the particular webpage.

Embodiment 16 is the method of any one of embodiments 1 through 15, further comprising: receiving, by the computing system, an indication that the client computing device received user input that modified the webpage code of the segment in a manner that addresses the quality issue, wherein the user input that modifies the webpage code of the segment in the manner that addresses the quality issue is specified a single time by user input; and implementing, by the computing system, the modification to the webpage code of the segment, which was specified the single time by user input, in every webpage in the subset of webpages.

Embodiment 17 is a system for assessing website quality based on automated website analysis, the system comprising: a website analysis server system to assess website quality; and a client computing device to provide a graphical user interface (GUI) presenting information about website quality as determined by the website analysis server system, the client computing device being configured to: output the GUI on a display of the client computing device, the website analysis server system being configured to: identify the website to evaluate, the website comprising webpages; retrieve code for the webpages that the website comprises from one or more web server systems that host the website; locally execute and interpret the code to render the webpages as they would appear on client computing devices; analyze the webpages to identify segments that satisfy website segment criteria; add webpages having the segments to a subset of webpages; identify at least one issue associated with at least one segment in the subset of webpages; determine a quantity of times that the at least one issue occurs across the subset of webpages; and transmit, to the client computing device, information to be presented in the GUI that includes an indication of the at least one issue and the quantity.

Embodiment 18 is the system of embodiment 17, wherein the at least one segment is identical to the segments across the subset of webpages.

Embodiment 19 is the system of any one of embodiments 17 through 18, wherein the at least one segment is similar to the segments across the subset of webpages.

Embodiment 20 is the system of any one of embodiments 17 through 19, wherein the segments are each at least one of a header, footer, metadata, and page content.

Embodiment 21 is the system of any one of embodiments 17 through 20, wherein the website analysis server system is further configured to: analyze the webpages to identify second segments in a second subset of webpages, wherein the second segments are different than the segments across the subset of webpages; and identify at least one issue associated with at least one segment in second subset of webpages, wherein the at least one issue in the second subset of webpages is different than the at least one issue in the subset of webpages.

Embodiment 22 is the system of any one of embodiments 17 through 21, wherein each webpage in the subset of webpages has the same at least one issue.

Embodiment 23 is the system of any one of embodiments 17 through 22, wherein the website analysis server system is further configured to identify a second issue associated with the at least one segment in the subset of webpages, wherein the second issue is different than the at least one issue.

Embodiment 24 is the system of any one of embodiments 17 through 23, wherein the website analysis server system is further configured to transmit, to the client computing device, information to cause the client computing device to present an indication of a type of the segments, wherein the type is at least one of a header, a footer, metadata, and page content.

Embodiment 25 is the system of any one of embodiments 17 through 24, wherein the website analysis server system is configured to analyze the webpages to identify segments that satisfy the webpage segment criteria based on applying a machine learning model to the webpages, wherein the machine learning model was previously trained to (i) identify similar elements in other webpages and (ii) group the similar elements into segments.

The devices, system, and techniques described herein may provide one or more of the following advantages. For example, grouping webpages based on same or similar segments can enhance user visibility of issues across the website. The disclosed techniques can provide for user-friendly presentation of issues in the website through one or more GUI displays. The website owner or other relevant user can view issues grouped or filtered by segment(s). The website owner can have a more holistic understanding of which issues exist across the website and which issues can be quickly and easily addressed. By fixing an issue in a segment of one webpage, a computer system can implement that same fix to all other webpages having the same segment.

As another example, grouping webpages based on same or similar segments can improve efficiency in addressing issues across the website, thereby improving overall website quality and user experiences with the website. As described herein, a computer system can implement a change to an issue in one webpage to all webpages that are grouped together for having the same or similar segment(s). Implementing the change across the group of webpages can result in quick and efficient response to identified issues in the website. Resolving the issues both quickly and efficiently can improve an overall quality of the website (such as a quality score of the website) and improve user experiences for users who use the website.

The disclosed techniques can also provide a developer associated with the web analysis server system with a breadth of selectable graphical options to define segment criteria for websites of different website owners. Therefore, the developer can uniquely define different types of segments for a website, which can be different than segments in other websites. For example, the developer may choose to identify a side menu as a segment and name this segment as header 1 for one website owner (e.g., customer). For another website owner, on the other hand, the developer may identify a menu at the top of the webpage as a segment and name this segment as header 1. Regardless of how the developer defines segment criteria, the web analysis server system can use the same techniques described herein to identify webpages in different website owners' websites that satisfy the segment criteria. The developer may also save the segment criteria and apply it to multiple website domains, thereby making it easy and efficient for the web analysis server system to identify and subsequently address issues, based on segments, in all the websites.

As another example, the disclosed techniques provide for automatically identifying and presenting issues to be fixed in the website based on identified segments in the website. The disclosed techniques can help the website owner efficiently use their time and resources to fix an issue once and then deploy that fix across the website to all other webpages having the same segment(s). Thus, overall quality of the website can improve, which further improves user experiences at the website.

The disclosed techniques also provide for improving processing efficiency for real-time website assessments to be generated, which can allow website owners to evaluate current versions of their websites, to respond more quickly to decreased quality by addressing or fixing an issue that appears across multiple webpages having the same segment(s), and to improve user experiences on the website. For instance, website owners can use an outputted list of issues filtered by segments to better manage their websites, such as to make particular changes on the website that would resolve the issue across multiple pages having the same segment(s).

In another example, the breadth of the segment criteria allows for a standardized and objective way for website quality to be quantified and addressed. Such quantification can provide a variety of advantages, such as permitting quality of a website to be readily compared and tracked over time, and/or permitting the quality of different websites to be readily compared to each other. Additionally, the disclosed techniques provide for digesting multitudes of webpages and content of a website to make it less difficult for the website owner to manage and improve the website.

In another example, GUIs and specific GUI features can be provided to assist the website owner in readily and quickly understanding what potential issues exist in the website and which potential issues to prioritize and/or address. For example, graphical features can be presented to visually and textually identify webpages having the same or similar segment(s), potential issues associated with each identified segment, and other information about the issues, segments, and/or webpages. Moreover, since webpages can be tagged and identified based on their segment(s), the website owner can readily identify and keep track of the webpages across dashboards, modules, applications, or other software that is provided to the website owner by the computer system. Such GUI features can permit for complex information to be presented in a simplified manner, permitting for it to be provided on a variety of different displays and to be easily digestible by the website owner.

The details of one or more implementations are set forth in the accompanying drawings and the description below. Other features and advantages will be apparent from the description and drawings, and from the claims.

BRIEF DESCRIPTION OF THE DRAWINGS

FIG. 9 is an example GUI for displaying footer segmentation of a webpage in a website.

Like reference symbols in the various drawings indicate like elements.

DETAILED DESCRIPTION OF ILLUSTRATIVE EMBODIMENTS

This document generally relates to identifying segments in webpages of a website and assessing website quality based on the segments. Issues in a webpage can be categorized based on segments in which those issues appear. Example segments include a header, a footer, certain content within a content area, a menu, and/or a portion of metadata. A computer system can use one or more algorithms, techniques, and/or machine learning trained models to identify similar or same segments in the webpages and then group those webpages. The computer system can use segment criteria to identify the same or similar segments. The segment criteria can be defined by a developer associated with the computer system. Sometimes, the segment criteria can also be defined by a website owner or other relevant user at a client computing device.

By grouping the webpages, fixing one issue in a segment in one of the webpages can cause the computer system or another computer system, such as a content management service (CMS) system, to implement that fix across all of the webpages in the group. As a result, fixes can be made to the website both quickly and efficiently to increase overall quality of the website and improve user experiences with the website. Grouping the webpages can also be beneficial to provide information to the website owner or other relevant user in a cohesive and user-friendly way. For example, webpage issues can be grouped and/or sorted by segment, which can assist the website owner to quickly and efficiently address similar issues across multiple webpages. To identify same or similar segments in the webpages, the computer system can compare HTML and/or CSS elements of the webpages with each other to identify common segments. Webpages having common segments can be grouped together. Although referred to as segments throughout this disclosure, segments are synonymous with, and can also be referred to as, sections.

Figure 1:
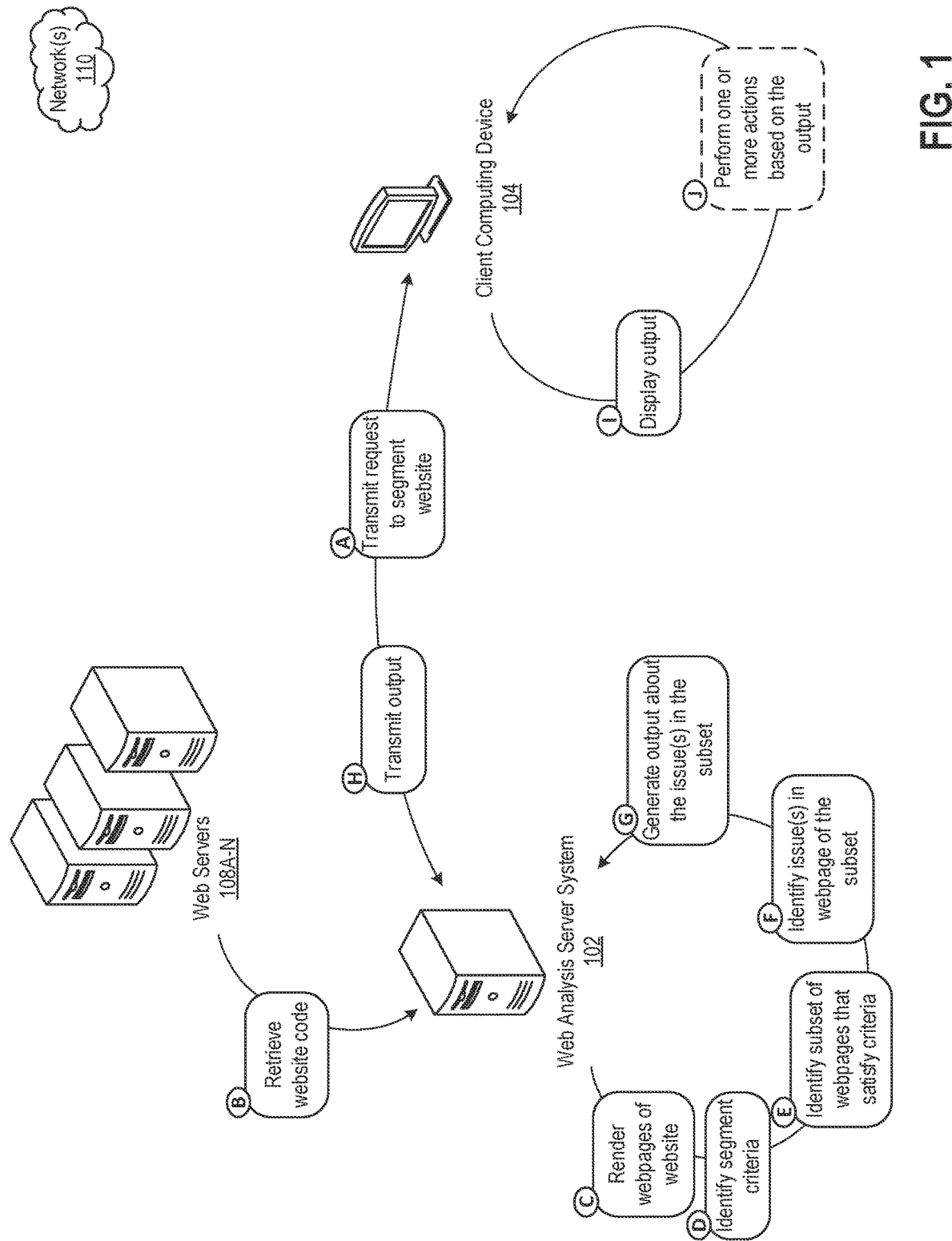
FIG. 1 is a conceptual diagram of a system and operations for identifying segments in webpages of a website.

Referring to the figures, FIG. 1 is a conceptual diagram of a system and operations for identifying segments in webpages of a website. A web analysis server system 102, client computing device 104, and web servers 108A-N can be in communication (e.g., wired and/or wireless) via network(s) 110. Although shown as separate components and systems, in some implementations, one or more of 102, 104, and 108A-N can be combined into a computing system or otherwise part of a network of computing devices, systems, and/or cloud-based services.

The web analysis server system 102 can be a computer, computing system, computing device, network of devices, cloud-based system, and/or cloud-based server that can provide website analytics to website owners (e.g., clients), website operators, and other relevant users. For example, the web analysis server system 102 can generate quality scores for websites of clients and provide suggestions for improving those websites based on particular client needs. As described herein, the web analysis server system 102 can also identify similar or same segments in a website and transmit information about the similar or same segments to the client computing device 104 to be presented in a GUI display to the website owner. The information can include issues, quality scores, and selectable options to address the issues. The web analysis server system 102 can also implement one or more fixes to an issue across all webpages having the same or similar segments based on receiving an indication of user input, from the client computing device 104, to implement the fix on one of the webpages.

The client computing device 104 can be a user device, including but not limited to a mobile phone, smartphone, laptop, tablet, computer, or other type of user device. The client computing device 104 can be used by the website owner (e.g., client) or other relevant user who operates the website and/or improves, changes, or modifies the website. The website owner can access services (e.g., modules, applications, etc.) provided by the web analysis server system 102 at the client computing device 104 so that the website owner can resolve potential issues at their website and improve their overall website.

The web servers 108A-N can maintain code for webpages of a website, to be transmitted to a user device of an end user and/or the client computing device 104. The website can then be rendered at the respective device, using the code from one or more of the web servers 108A-N. As described herein, the code can also be transmitted to the web analysis server system 102, and used by the web analysis server system 102 to locally render and execute the website as if it were presented at a user device, such as the client computing device 104. The web analysis server system 102 can then use the rendered website to perform analytics, including but not limited to assessing and identifying issues in the website, identifying segments in webpages of the website, and determining quality scores for the website.

Still referring to FIG. 1, the client computing device 104 can transmit a request, to the web analysis server system 102, to segment a website of the website owner (step A). The request can include a website ID, such as a URL. The web analysis server system 102 can use the website ID to retrieve website code from the web servers 108A-N (step B).

Using the code, the system 102 can render webpages of the website as they would appear at a user device, such as the client computing device 104 (step C), for example, using a headless browser that renders the webpage in memory but does not visually display the webpages.

The system 102 can then identify webpage segment criteria in step D. A developer of the system 102 can define the webpage segment criteria. The system 102 can also automatically define the webpage segment criteria. In some implementations, the website owner can define the webpage segment criteria. Webpages that satisfy the criteria can be marked, tagged, or otherwise identified as having the segment(s) that corresponds to the criteria, which can improve visibility and assist the website owner in viewing issues based on segments.

For example, the developer can define criteria for a header segment having selectable menu options. Thus, any webpage in the website owner's website that meets this criteria can be tagged and grouped for having the header segment. The developer can also define another set of criteria for any webpage whose footer segment contains a "Contact Us" button. Webpages that meet the other set of criteria can be tagged and grouped for having the header segment. The grouped webpages can be presented in a user-friendly way, in a GUI display at the client computing device 104, to assist the website owner in reviewing and addressing same or similar issues that appear across all the webpages in the group.

The segment criteria can be inputted into a mobile application, module, or other software that is presented at a user device of the developer and provided to the web analysis server system 102 or otherwise stored in a data store (which can then be retrieved by the system 102). As mentioned above, default criteria can be set for any website and the developer (and optionally the website owner) can customize that criteria. As a result, uniquely defined segment criteria can be used for different websites. The default criteria can be based on, for example, elements in a webpage that are defined by typical HTML element classes, such as headers, footers, metadata, and page content. The developer can further refine this default criteria (or set entirely new criteria) based on how the website owner defines/designates content in headers, footers, metadata, and page content elements in their website. Refer to FIGS. 6-9 for additional discussion regarding the segment criteria.

Once the pages of the website are rendered and the segment criteria is identified, the system 102 can identify a subset of webpages that satisfy the criteria (step E). In other words, the system 102 can identify webpages having the same or similar segment(s). If a webpage in the website meets the criteria, then that webpage is identified and grouped with other webpages that satisfy the same criteria. Therefore, webpages having the same or similar segments can be grouped together. Each of the webpages in the subset of webpages can also be given a tag that identifies the group. The tag can be used for fast retrieval and improved visibility of information associated with the subset of webpages (such as issues that are in common across all the webpages in the subset of webpages)

The system 102 can continuously crawl the owner's website to identify those webpages. The system 102 can also crawl the website at periodic time intervals. In some implementations, the website owner can trigger when individual webpages are crawled by the system 102 instead of or in addition to crawling the entire website.

The system 102 may also crawl the website in the background as the website owner runs other analytics engines, performance tests, or otherwise updates their website. Thus, the system 102 may identify webpages having the same or similar segments before the website owner requests to view a user interface that identifies and groups information (such as issues) based on segments in the website. When the website owner requests to view this information, groupings of webpages based on segments can be quickly retrieved by the system 102 (e.g., from a data store such as data store 106 described further in FIG. 5), transmitted to the client computing device 104, and presented thereon. As a result, compute resources and processing power can be efficiently used to provide for fast results that are presented to the website owner at the client computing device 104.

The system 102 can also identify one or more issues in a webpage of the subset of webpages (step F). As described herein, issues may be previously determined by one or more other engines or services that are provided by the system 102. Thus, in step F, the system 102 may simply retrieve, from a data store or one or more other engines, one or more issues that have been identified for the webpage. In some implementations, the system 102 can request one or more of the other engines or services to identify one or more issues in the webpage in step F.

Although issues are only identified for one webpage in the subset of webpages, because all the webpages in the subset of webpages have the same or similar segment, the issue(s) of identified in a segment of one webpage in the subset is a same issue(s) for all the webpages in the subset. Therefore, in some implementations, the system 102 can apply any changes to the issue(s) in one webpage to the corresponding issue(s) in all the webpages in the subset of webpages. For example, all the webpages in the subset of webpages can have the same header segment: a menu of selectable options to navigate the website. An issue identified for one of those webpages can be a misspelling in the menu: "Homie" instead of "Home." This issue can also be identified for all other webpages in the subset of webpages because all the webpages contain the same header segment: the menu with the misspelled word. Thus, if the website owner decides to correct the spelling of "Homie" to "Home" in one of the webpages, the system 102 can automatically implement that spelling correction across all of the webpages in the subset of webpages or implement the correction in response to the website owner making the spelling correction to one of the webpages. In some implementations, the website owner can make the correction in an interface provided by a content management service (CMS). The CMS interface can be linked or otherwise integrated with output provided by the system 102. Thus, the website owner can select an issue in the output provided by the system 102 to then be directed to the CMS interface where the website owner can implement corrections to the misspelled word. The disclosed techniques can therefore provide for a fast, accurate, and efficient way to resolve issues in the website and improve overall quality of the website.

Figure 10:
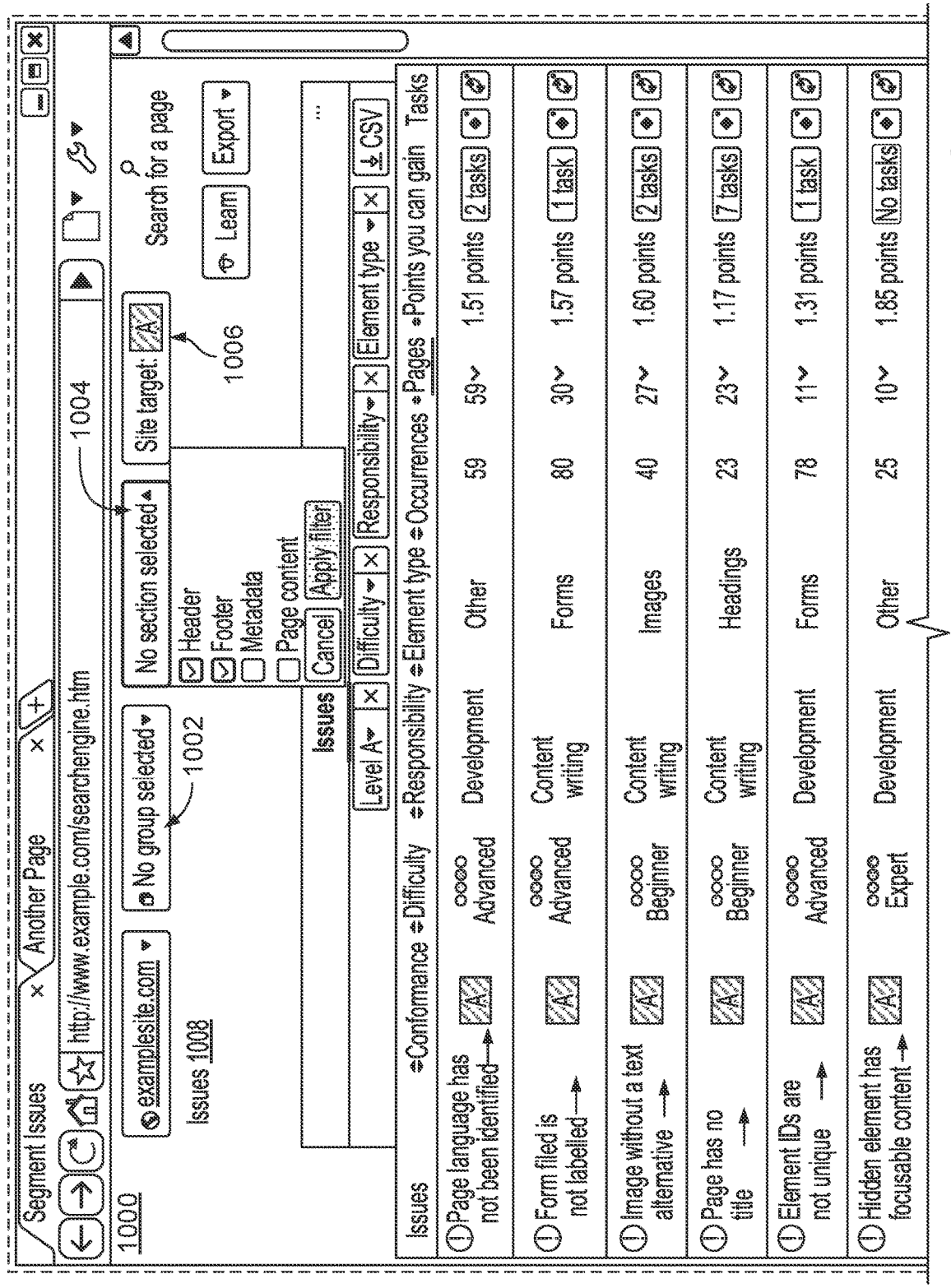
FIG. 10 is an example GUI for displaying issues based on segments for a website.

The system 102 can generate output about the issue(s) in the subset of webpages (step G). The output can include indications of a type of issue(s) identified for the webpages in the subset, selectable options to check, fix, and/or resolve the issue(s), an indication of an average quality score for the subset of webpages, an indication of a type of segment that the webpages in the subset all share, and/or a selectable option for update, modify, and/or delete the criteria used to identify the segment in the website. Refer to FIG. 10 for discussion about information that can be outputted and presented to the website owner at the client computing device 104. One or more other indications and/or selectable options can be generated as output in step G to be presented to the website owner in a GUI display at the client computing device 104.

Accordingly, the system 102 can transmit the output to the client computing device 104 (step H). In some implementations, the output, or portions of the output, can also be transmitted to a data store to be stored and then retrieved and outputted at another time.

The client computing device 104 can display the output in step I. Any other output generated by the system 102 can also be presented in one or more GUI displays (e.g., modules, dashboards, etc.) at the client computing device 104.

Optionally, the client computing device 104 can perform one or more actions based on the output (step J). For example, the website owner may select an option to correct an issue in one of the webpages in the subset of webpages. The client computing device 104 can present another GUI display for the website owner that allows the website owner to change one or more elements in the one webpage to correct the issue. The website owner can also select one or more options that cause the client computing device 104 (or the system 102) to implement one or more user-defined changes (or system 102—suggested changes) to remedy the issue(s) in the webpage. When a change is made to one webpage in the subset of webpages, the change can also be implemented, by the system 102 or another system, such as a CMS system, across all the webpages in the subset of webpages. As a result, changes/fixes can be made quickly, efficiently, and accurately across the website, thereby improving overall quality of the entire website and not just quality of a particular webpage of the website.

Figure 2A:
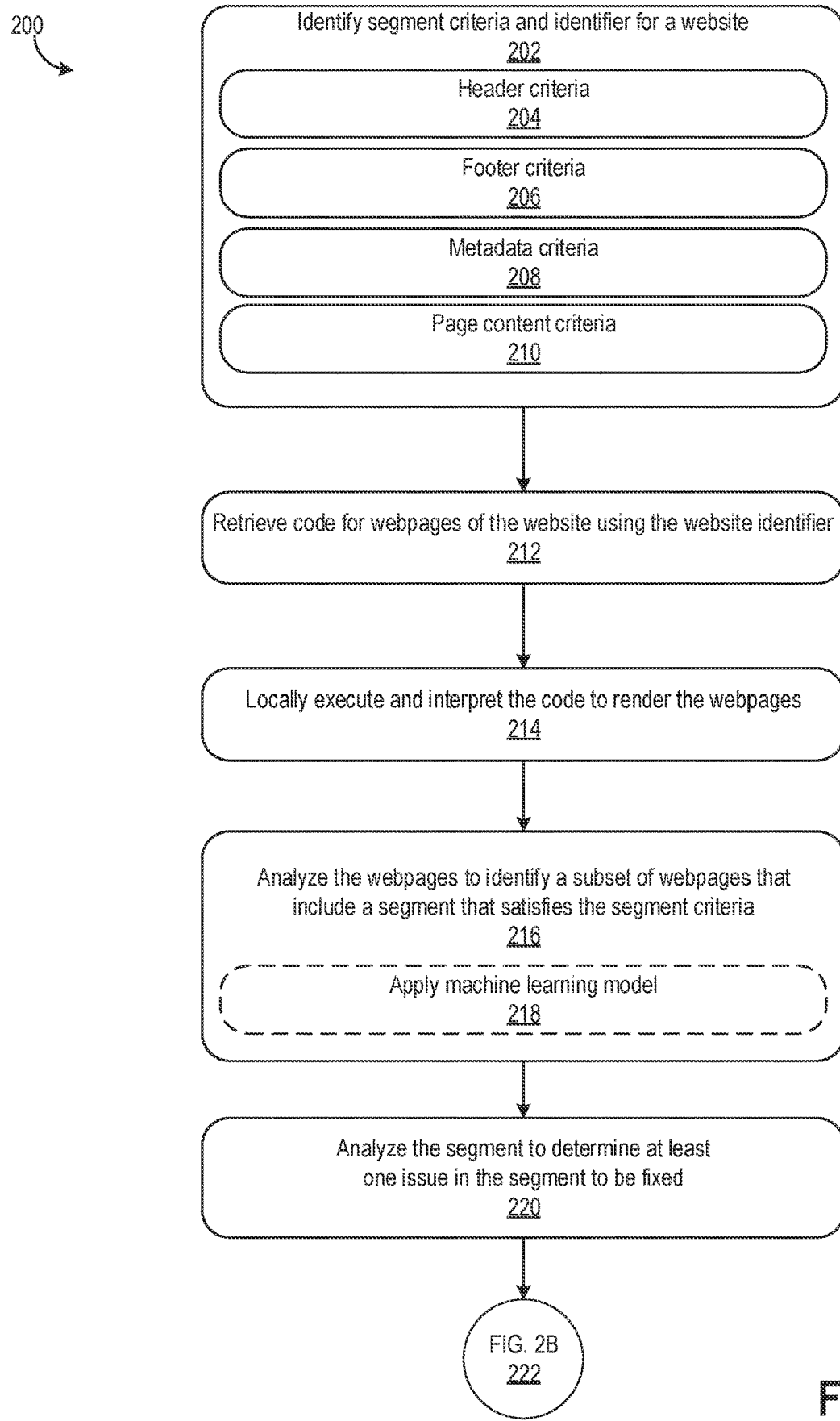
FIGS. 2A-C is a flowchart of a process for identifying issues across webpages that have similar segments.
Figure 2B:
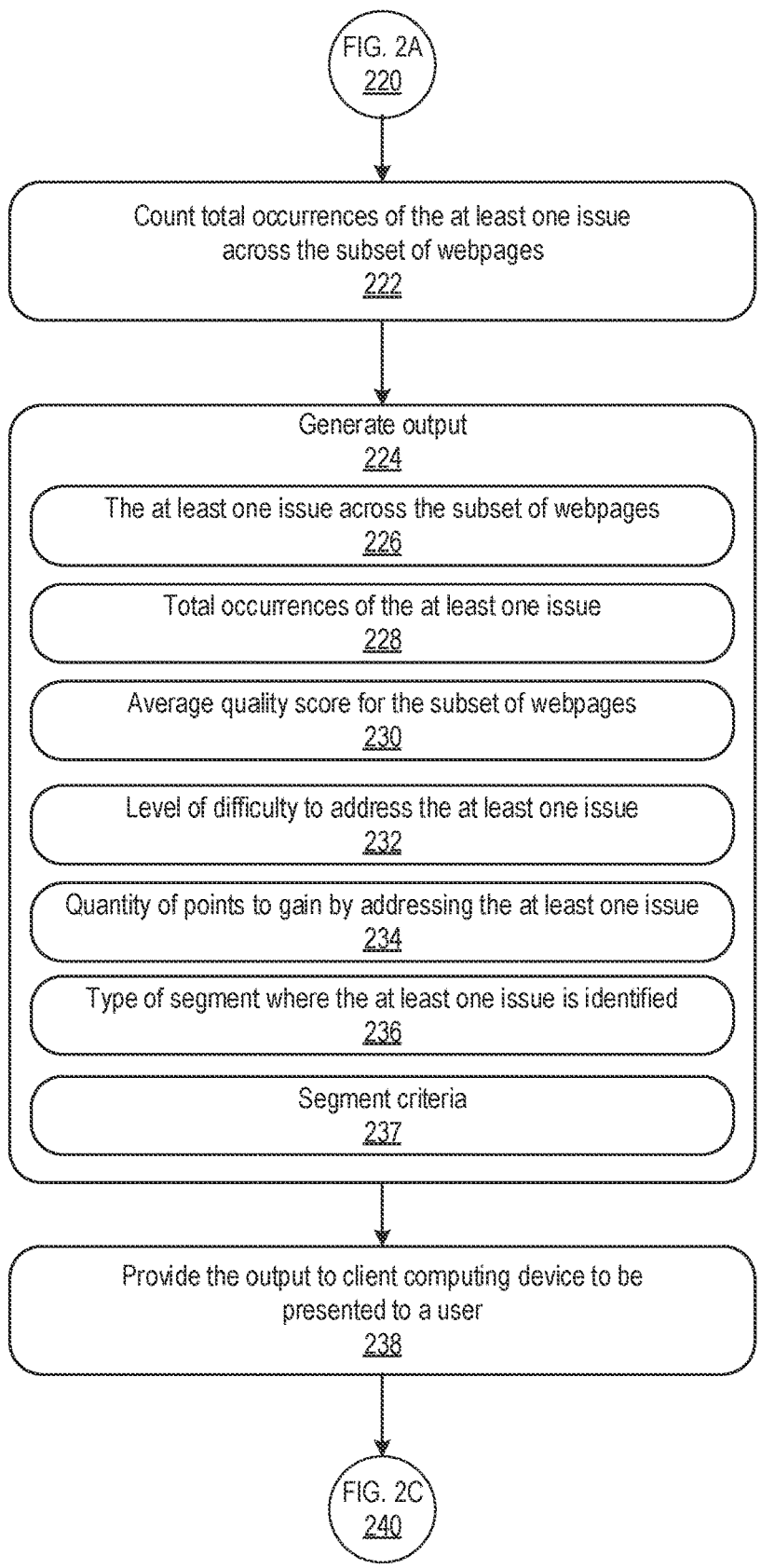
Figure 2C:
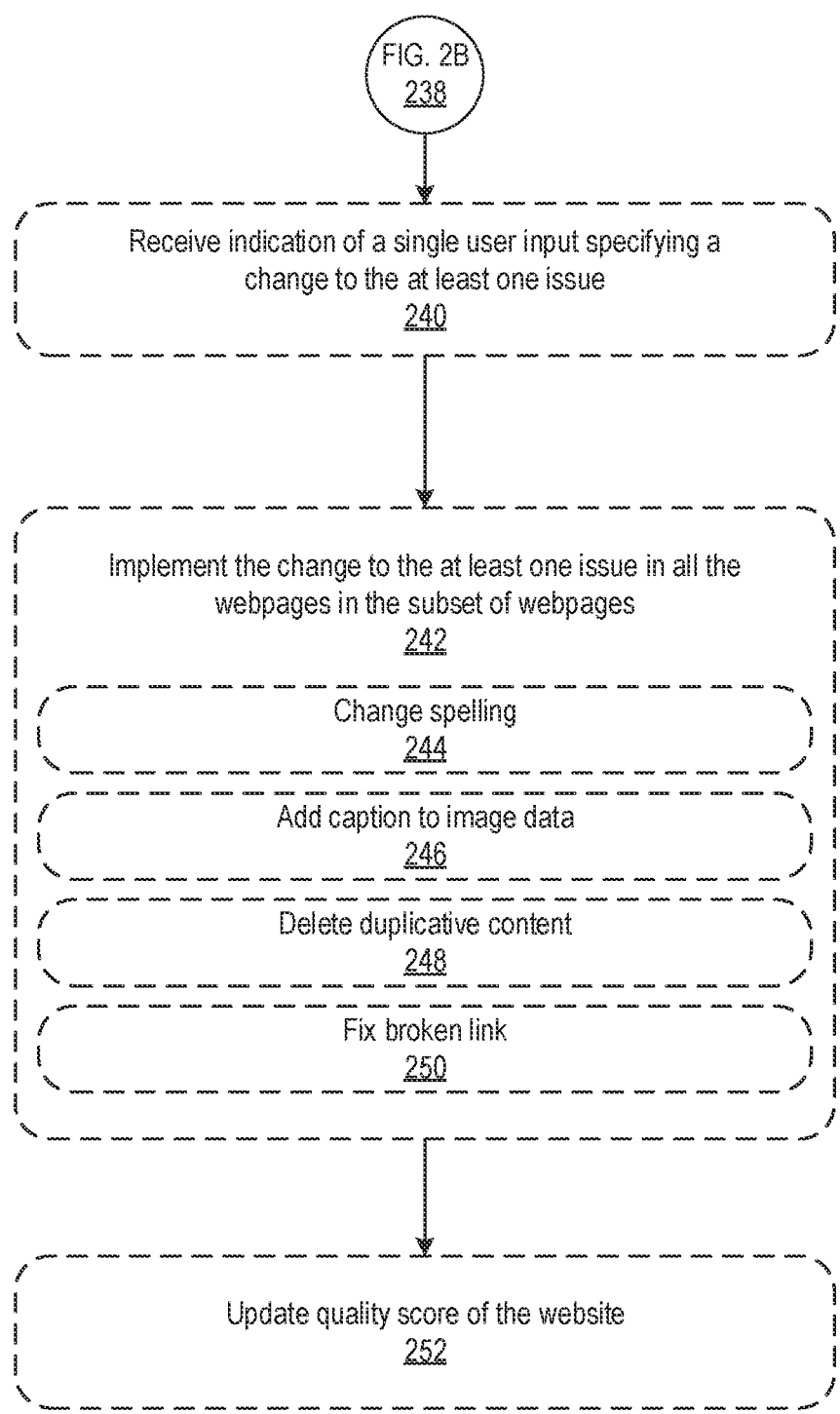

FIGS. 2A-C is a flowchart of a process 200 for identifying issues across webpages that have similar segments. The process 200 can be used to identify an issue in one webpage in a group of webpages having the similar or same segment and, subsequently, identify that issue for all webpages in the group. Therefore, when the issue is addressed/fixed in one webpage, that fix can be automatically applied, by a computer system, to all other webpages in the group for quick and efficient resolution of issues across the website.

The process 200 can be performed by the computer system 102. The process 200 can also be performed by one or more other computing systems, devices, computers, networks, cloud-based systems, and/or cloud-based services. For illustrative purposes, the process 200 is described from the perspective of a computer system.

Referring to the process 200 in FIGS. 2A-C, the computer system can identify segment criteria and an identifier for a website in block 202. As described herein, a developer associated with the computer system can generate/determine criteria that is used by the computer system to identify segments in a webpage and respective groups of webpages of the website that have respective same or similar segments. In some implementations, the computer system can automatically determine or generate the segment criteria. In yet some implementations, the website owner can generate segment criteria.

A module can be presented in a GUI display at a user device of the developer for generating the segment criteria. For example, the computer system can provide information to the device to cause the device to display the GUI that presents (i) a particular webpage of the website concurrently with (ii) indications of multiple segments present across the webpages of the website. The GUI can include a side panel that is adjacent to the presentation of the particular webpage in the GUI. The side panel can include indications of the multiple segments present across the webpages of the website and selectable options to generate the segment criteria. The indications of the multiple segments as part of the side panel can represent segments present across the webpages of the website and the computer system can identify the particular webpage that is presented in the GUI as including a group of segments that may be less than all of the segments present across the webpages of the website. Therefore, some of the segments represented by the indications of the multiple segments that are visually shown in the side panel may not be present in the particular webpage. In some implementations, the particular webpage may have more than one or up to all of the segments present across the webpages of the website.

In some implementations, the computer system can also receive an indication that device received user input that interacted with the presentation of the indications of the multiple segments to indicate selection of a user-selected segment of the multiple segments. The computer system can then provide information to the device to cause the device to highlight, in the GUI, a portion of the webpage that corresponds to the user-selected segment. Refer to FIGS. 6-9 for additional discussion about GUI displays that allow for user-selection of criteria that is used by the computer system to identify segments and group webpages based on segments.

The segment criteria can include header criteria in block 204, footer criteria in block 206, metadata criteria in block 208, and/or page content criteria in block 210. The segment criteria can also be defined by the developer as any other type of HTML element in the owner's website. Refer to FIGS. 6-9 for additional discussion about defining and modifying the segment criteria. In brief, the developer can define criteria that can be used by the computer system to split webpages of the website into segments based on shared features across the website. For example, the segment criteria can require identifying a header (block 204) and footer (block 206) on each webpage in the website to create three groupings: header, footer, and page content (non-segment areas in the webpage). It is possible for a webpage to include multiple segments of a certain type (e.g., two different headers and three different footers).

The example criteria in blocks 204-210 is non-exhaustive. In some implementations, the developer can create and customize additional criteria specific to the owner's website. Any of the example criteria in blocks 204-210 can also be defined with exact values, such as tags, classes, and element types, which can narrow a total quantity of webpages that are identified as having the same or similar segment(s) and thus grouped together.

In some implementations, the computer system can automatically analyze the website to identify and group common segments, such as headers, footers, metadata, and/or page content, across the webpages of the website. The computer system can use a set of default segment criteria to identify the segments and group the webpages based on segment types and/or categories. In some implementations, the developer (and optionally the website owner) can then alter, modify, and/or delete the default segment criteria that was used by the computer system, as described in block 202.

The computer system can retrieve code for webpages of the website using the website identifier (block 212). The code can be retrieved from web servers, such as the web servers 108A-N depicted and described herein. The computer system can receive the website identifier with the segment criteria in block 202. In some implementations, the computer system can determine the website based on other information that can be provided with the segment criteria in block 202, such as a unique identifier or other account information associated with the website owner or a call to the particular website in the segment criteria. The computer system can then poll one or more web servers for code for webpages of the website by providing the web servers with the website identifier. The web servers can locate the code for the webpages of the website, and transmit the code to the computer system.

In block 214, the computer system can locally execute and interpret the code to render the webpages. The webpages can be rendered as if they are being presented at a client computing device or other user device. In other words, the webpages can be rendered as they would appear to an end user who accesses the website through a web browser at their user device (e.g., mobile phone, smartphone, computer, laptop, tablet, etc.), although the rendering can also be performed in memory by a "headless" web browser that does not actually present content on a display device.

Figure 11A:
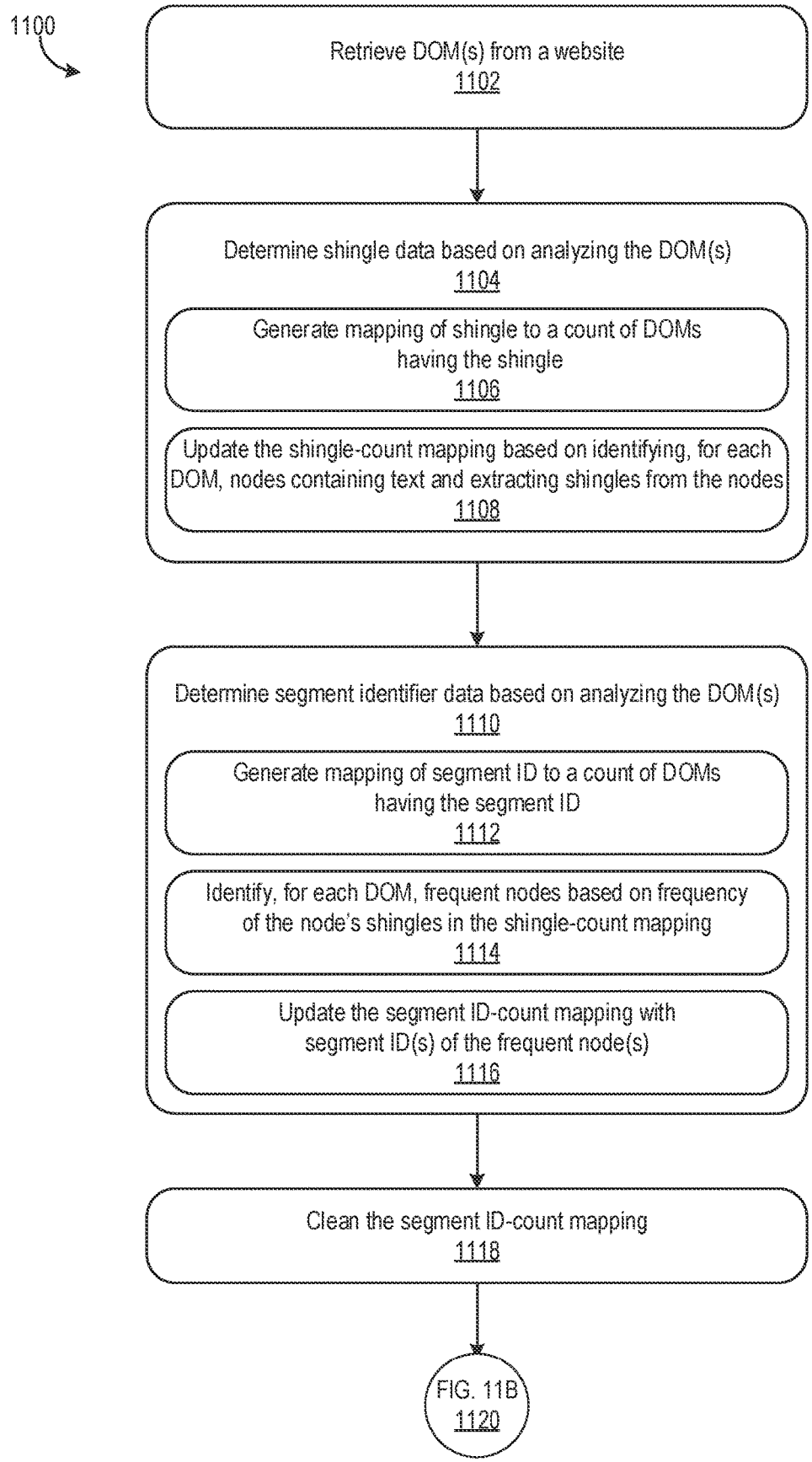
FIGS. 11A-B is a flowchart of a process for identifying segments in webpages of a website.
Figure 11B:
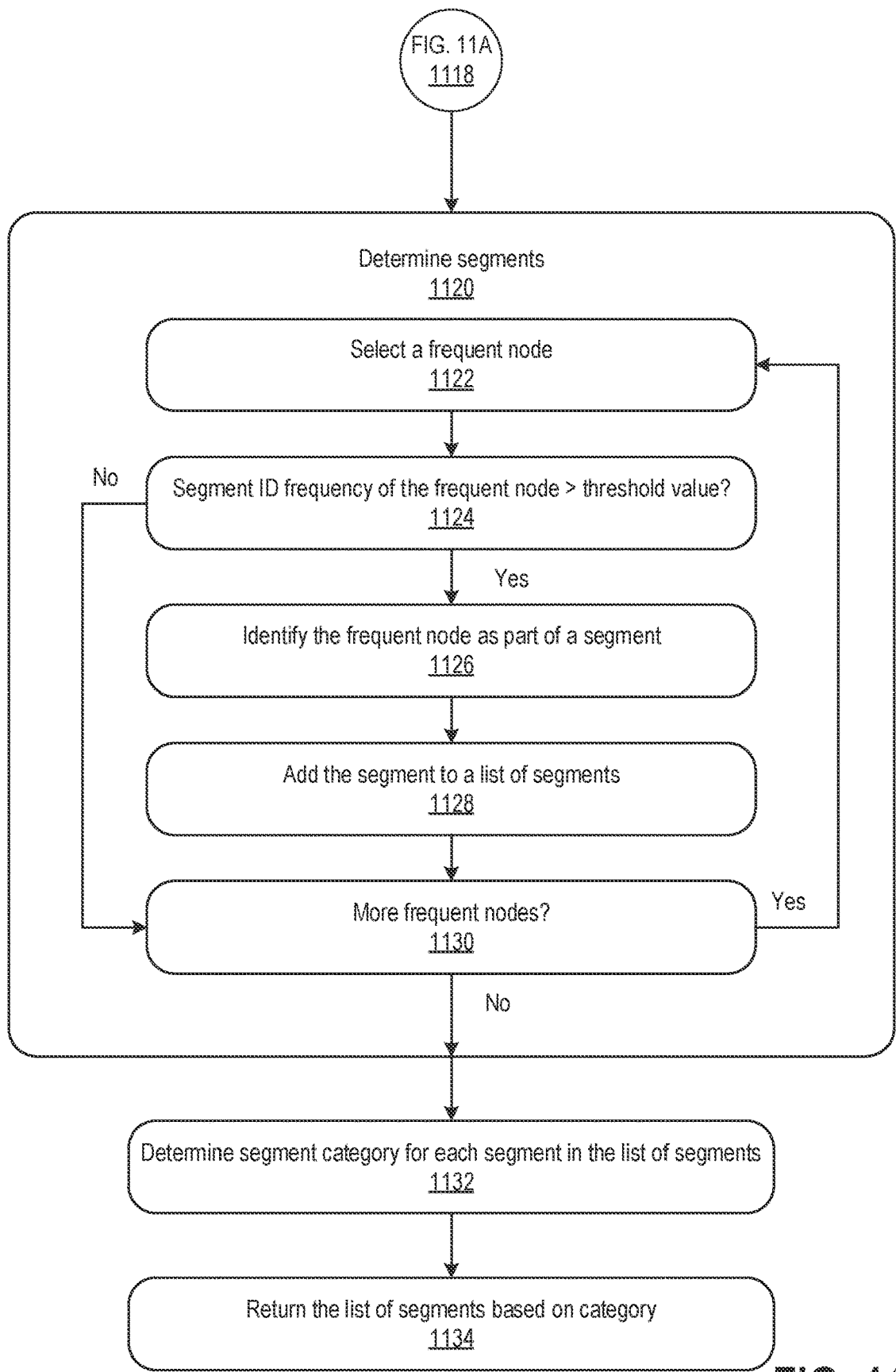

The computer system can then analyze the webpages to identify a subset of webpages that include a segment that satisfies the segment criteria (block 216) (this process can be repeated for each segment to identify multiple respective sets of webpages). Refer to FIGS. 11A-B for additional discussion on identifying segments. In brief, the computer system can identify webpages that have the same or similar segments by analyzing HTML and/or CSS elements in DOMs of the webpages. A webpage having HTML and/or CSS elements in a segment that satisfy the segment criteria can be identified or otherwise added to a group of webpages (e.g., the subset of webpages) having the same or similar segments. Each webpage of the website can include multiple segments that are identified by the computer system based on respective segment criteria. Each webpage of the website may also include multiple types of segments.

Figure 4:
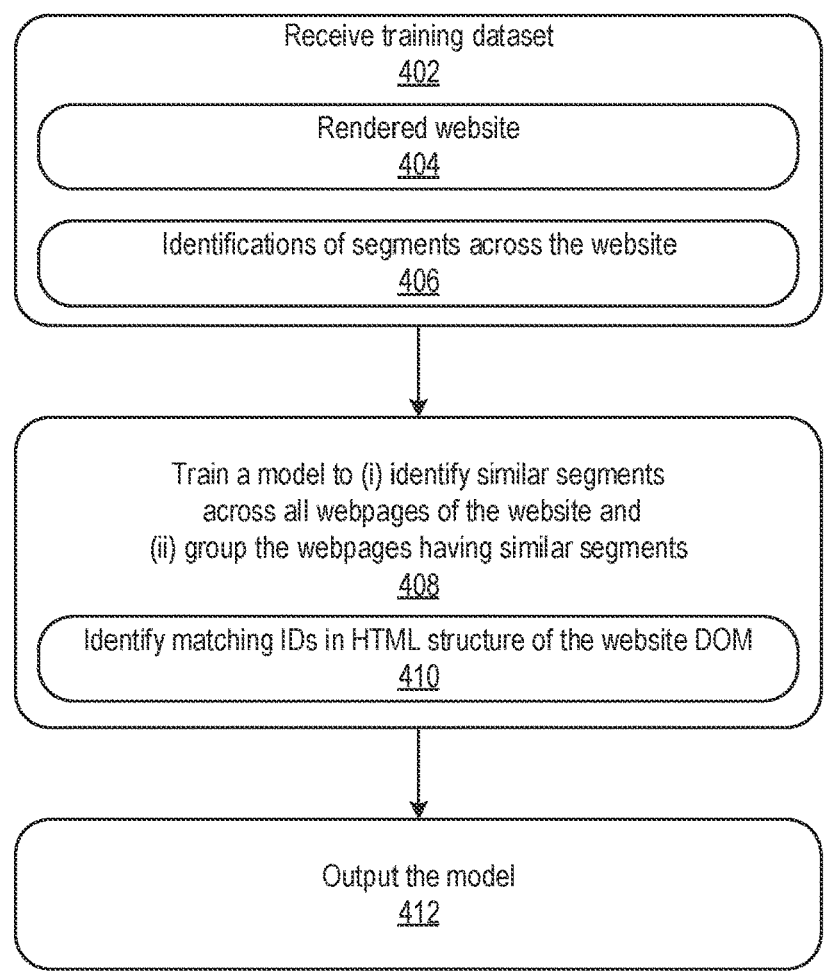
FIG. 4 is a flowchart of a process for training a machine learning model to identify segments in webpages of a website.

Optionally, the computer system can apply a machine learning model to identify a scope of the segment (e.g., a beginning of the segment in code and an end of the segment in code) and webpages that have the same segment, according to the segment criteria (block 218). Refer to FIG. 4 for additional discussion on training the model to identify the segments. In brief, the model can be trained to analyze the DOMs of the webpages and identify which webpages, based on analysis of their DOMs, have DOM elements that satisfy the segment criteria. The model can be trained to efficiently identify elements in the webpage DOMs that match different variations of segment criteria and then group together the webpages having those elements.

The computer system can analyze the identified segment to determine at least one issue in the segment to be fixed (block 220). In other words, the computer system can determine whether any issues are associated with the particular segment, such as quality issues. As described herein, one or more services (e.g., engines, modules, etc.) of the computer system can be configured to identify issues across a website. The services can operate in the background and can identify issues at one or more different time intervals. Sometimes, the services can identify issues before the process 200 is performed or at least before the block 220 is performed. The identified issues can be cached for quick retrieval at a later time. In such scenarios, the computer system can retrieve the at least one issue that was identified by the services in block 220. This can be beneficial to save compute resources and improve processing efficiency. After all, the computer system may not have to identify issues in real-time in block 220.

In some implementations, however, the computer system can identify issues that may be associated with the segment in real-time. For example, if one or more elements in the segment have been changed or otherwise modified since a previous time that issues were identified for the segment, the computer system can run another check of the segment to identify new issues therein. More particularly, the computer system can request one of the services to analyze the segment and identify any issues associated with the segment. The computer system may only analyze the segment in a single webpage for issues, since the computer system may have previously determined that the segment is the same across all webpages in a group of webpages.

Blocks 216-220 can be performed multiple times in the process 200, such as when multiple segment criteria are used by the computer system to identify different types and/or categories of segments across the website. For example, the computer system can analyze the webpages of the website to identify a second subset of webpages that include a second segment that is different from the segment described herein. The second subset of webpages can satisfy a second user-defined segment criteria. The second subset of webpages can be different from the subset of webpages described herein. In some implementations, one or more webpages in the second subset may also be in the subset described herein. After all, some webpages may include multiple different segments. The computer system can then identify a second quality issue (or more) in the second segment that is present in each webpage in the second subset of webpages.

In block 222, the computer system can count total occurrences of the at least one issue across the subset of webpages. For example, the computer system can identify how many times the at least one issue is associated with a webpage in the subset of webpages. In block 222, the computer system can also determine how many webpages in the subset of webpages have the at least one issue. The total occurrences of the issue and/or the total quantity of webpages with the issue can be presented at the client computing device in a GUI display, as described further below.

In some implementations, the more frequent the occurrence of the at least one issue in the subset of webpages (or the higher total occurrences of the at least one issue), the more important it may be to resolve that at least one issue. After all, by resolving a very frequent issue across the website, the website's overall quality score can increase by a greater amount of points than addressing an infrequent issue that only appears on a few webpages of the website. Therefore, addressing issues with high total occurrences can result in quickly improving overall quality of the website and, consequently, user experiences for users who access the website.

The total occurrences of the at least one issue can also be used by the computer system to determine how many points the quality score of the website can gain if the at least one issue is resolved. For example, the quality score can increase by 0.2 points if the at least one issue is fixed on one webpage. However, if 10 webpages have the at least one issue, then implementing the fix across all the 10 webpages can cause the quality score to be increased, by the computer system, by 2 points. When the website owner views the 2 point gain in comparison to the 0.2 point gain, the website owner may be more inclined to address the at least one issue (which causes the computer system to automatically implement the fix across all 10 webpages), because their change will have a more significant impact on the website quality score.

The computer system can then generate output to be presented in a GUI display, or multiple GUI displays, at the client computing device (block 224). For example, the output can include code that can be rendered at the client computing device to generate a webpage that presents the at least one issue associated with the segment that is common across the subset of webpages. The output can include an indication of the at least one issue across the subset of webpages (block 226). The output can also include options that can be selected by the website owner to address the at least one issue (e.g., mark the issue as resolved or not an issue, implement a change that fixes the issue, etc.). The output can also include an indication of the total occurrences of the at least one issue in the subset of webpages (block 228). This indication can visual depict how many webpages in the subset of webpages have the issue.

Moreover, the output can include a selectable option to filter a presentation of issues present across the webpages of the website to a subset of issues that can be specific to one or more user-selected categories of segments from among a collection of user-selectable categories of segments. The collection of user-selectable categories of segments can include a headers category, a footers category, and a metadata category. In some implementations, the computer system can receive an indication that the client computing device received user input that interacted with the selectable option to select multiple categories of the collection of user-selectable categories of segments. Thus, the computer system can generate updated output of based on this user input, which can be transmitted and presented in the GUI display at the client computing device. Sometimes, the computer system can receive an indication that the client computing device received user input to select one of the categories from the collection of user-selectable categories of segments. Accordingly, the computer system can provide information to the client computing device to cause the client computing device to change a GUI display at the client computing device from (i) presenting indications of issues that are relevant to all webpages of the website to (ii) presenting only indications of issues that are relevant to webpages that include any segment from the user-selected category.

If, for example, the computer system then receives an indication that the user input interacted with the selectable option to select a second category in addition to the previous category, then the computer system can provide information to the client computing device to cause the client computing device to change/update the GUI display from (i) presenting only indications of issues that are relevant to webpages that include any segment from the previous category to (ii) presenting only indications of issues that are relevant to webpages that include any segment from the previous category and indications of issues that are relevant to webpages that include any segment from the second category. Sometimes, the segments with the previous category can be present across a first subset of webpages of the website and the segments with the second category can be present across a second subset of webpages of the website. The first subset can be different from the second subset.

In some implementations, as described herein, one or more webpages can be in both the first and second subsets, such as when such webpages have both segments within the previous category and the second category. In yet some implementations, the second category can represent content of the webpages of the website that is not specified by segment criteria and that is other than the segments of the previous category of segments. Refer to FIG. 10 for additional discussion about filtering information that is presented in a GUI display at the client computing device.

The output can include an indication of an average quality score for the subset of webpages (block 230). In some implementations, the indication can also include a quality score for each of the webpages in the subset. The indication may also include the overall quality score for the website. In some implementations, the output may include an indication of a level of difficulty to address the at least one issue (block 232). This type of indication can be beneficial to the website owner to determine which issue(s) may be easier/quicker to address first and/or which issue(s) should be assigned to which employees or other users who have access to the website. For example, the website owner may desire to address issues that are identified as "easy" first to quickly get those issues resolved and thus increase the overall quality score of the website. As another example, the website owner may desire to assign fixing issues that are identified as "difficult" to experienced developers who have more knowledge and expertise to correctly handle and resolve those issues than less experienced developers.

In some implementations, the output can include an indication of a quantity of points to gain by addressing the at least one issue (block 234). The indication can visually depict how much the overall quality score of the website (or the average quality score of the webpages in the subset) would increase by addressing the at least one issue (which also automatically causes the computer system to resolve the issue in a same manner in all the webpages having the same issue). The indication can visually depict a numeric value indicating how many points the overall quality score of the website (or the average quality score of the webpages in the subset) would gain by resolving the at least one issue. The indication in block 234 can be beneficial to help the website owner prioritize review and resolution of issues in the website. For example, if the website owner sees that the overall quality score of the website can improve significantly by addressing the at least one issue, then the website owner may decide to tackle and resolve the at least one issue, or at least prioritize tackling and resolving the at least one issue over other issues in the website. As another example, if the website owner sees that the overall quality score would increase by a marginal amount of points if the website owner were to resolve the at least one issue, the website owner may decide to tackle and resolve other issues before the at least one issue. After all, the quality score of the website may be impacted more by addressing the other issues in comparison to the at least one issue.

Moreover, the output can include a type of segment where the at least one issue is identified (block 236). The type of segment, as described herein, can be a header, footer, metadata, and/or page content. One or more other types of segments can be defined by the website owner in block 202. Displaying the type of segment in the output can be beneficial to provide context to the website owner about where the at least one issue can be found in a webpage. The website owner, for example, may be more inclined to fix the at least one issue immediately if the at least one issue appears in a very visible segment, such as a main menu in the header. Fixing this issue immediately can have a more direct and immediate impact on improving the overall quality score for the website and/or user experiences with the website.

The output can also include an indication of the segment criteria in block 237. Thus, the website owner can be presented with the segment criteria that was used to identify the segment(s) in the subset of webpages. The output can further include selectable options to modify (e.g., edit, delete, create) the segment criteria. This output can provide more context to the website owner about how the segments were identified. This output can also improve user functionality by making it easy for the website owner to toggle between reviewing results from segmenting the website and modifying or creating the segment criteria that is used to segment the website.

Refer to FIG. 10 for additional discussion about the output.

The computer system can provide the output to the client computing device to be presented to a user, such as the website owner (block 238). In some implementations, the computer system can identify one or more privileges of the website owner to determine what information (such as type of segments, type of issues, etc.) the website owner is permitted to view/access. In some implementations, the output can be presented to another user associated with the website, who may only be allowed to view issues associated with a particular type of segment, such as headers. Thus, the computer system may identify the user's privileges and only provide the output to the client computing device that aligns with the user's privileges.

The output can be presented in one or more different dashboards, software applications, and/or modules that are provided by the computer system to be presented at the client computing device for the website owner. This can be beneficial to increase visibility of webpages that are grouped by segment and the associated issues to assist the website owner in prioritizing review and resolution of issues in the website. In some implementations, the output can be presented within a plugin or other feature for displaying information from a variety of services that are provided by the computer system. For example, in the plugin, data about a particular webpage can be fetched and displayed. The criteria used to identify that webpage as having a particular segment can also be outputted/presented in the plugin. Moreover, determinations made by one or more other services can be presented in designated blocks in the plugin. As a result, the website owner can view a variety of information, analytics, and/or insights about their website from a singular view. The website owner can click into any of the information, analytics, and/or insights to learn more information.

The particular webpage can already be published to the website. In some implementations, the particular webpage may not yet be published. Identifying the webpage as having the same segment and an issue associated with that segment can be beneficial to allow the website owner to check and update that webpage to improve its quality before it goes live.

As another example, the output can be presented in a dashboard that lists all the webpages for the website. The dashboard can also include tags for each of the webpages. Webpages that have been identified as having the same segment(s), and thus the same issue(s), can include tags indicating them as such. The tags can be used to increase visibility of webpages having the same issues and therefore help the website owner in prioritizing review and resolution of issues across the website.

Optionally, the computer system can receive an indication of a single user input specifying a change to be made to the at least one issue in block 240. In other words, the computer system can receive an indication that the client computing device received user input that modified webpage code of the segment in one webpage in a manner that addresses the quality issue. That user input can be specified a single time.

The website owner can decide to address the at least one issue. At the client computing device, the website owner can select a graphical indication or other option presented in the GUI display that takes the website owner to another GUI display for reviewing the at least one issue, discussed further below. At the other GUI display, the website owner can provide input that is intended to fix the issue. In some implementations, the input can indicate that the issue is not actually an issue. Thus, the input can be used by the computer system to identify the at least one issue as being resolved. In block 240, the website owner can provide input at a single time to fix the issue across the entire website. Thus, although the website owner may provide input that directly addresses the issue on one webpage, the computer system, or another system such as a CMS system, can replicate the fix across all the webpages in the subset of webpages, as described in block 242.

In block 242, the computer system can optionally implement the change to the at least one issue in all the webpages in the subset of webpages. In other words, the computer system can apply the change that was provided by the user input (block 240) to each webpage in the subset of webpages that has the same segment (and thus, the same issue). This is possible because segments such as headers, footers, and metadata are largely considered templates, which makes it easy and efficient to implement template-related issues across the subset of webpages. The computer system can implement the modification to the webpage code of the segment, which was specified by the single time by user input, in every webpage in the subset of webpages.

Even though the website owner merely determines a resolution for the at least one issue in one webpage, the computer system can apply the resolution to all the webpages having the same segment as the one webpage because of the associations that were previously made in identifying same segments across the website. Applying the resolution to all the webpages having the same segment can be beneficial to quickly, efficiently, and accurately resolve issues in the website, which, in turn, can quickly increase the quality score of the website and improve user experiences with the website.

The change can include one or more different actions. These actions can be defined, determined, and/or inputted by the website owner at the client computing device, then transmitted to the computer system to be performed. In some implementations, the computer system can suggest one or more of these actions, which can be presented at the client computing device to then be reviewed and selected by the website owner. Whatever suggested action(s) the website owner selects can then be executed/performed by the computer system.

The change can include changing spelling (optional block 244). For example, a misspelling issue can be identified in a header segment of a webpage. A word "Menu" in the header segment may be misspelled as "Menue." The website owner can view the header segment of the webpage and decide whether "Menue" is actually a misspelling. If it is, the website owner can manually change "Menue" to "Menu." The website owner can then select an option (such as a button) that causes the computer system to change "Menue" to "Menu" in every other webpage having the same header segment. Manually changing the spelling can also cause the computer system to automatically perform the same action in the other webpages having the same segment. In some implementations, the website owner can also be presented with a suggestion to change the spelling of "Menue" to "Menu." The website owner can select this suggestion, which can cause the computer system to change "Menue" to "Menu" in every webpage, including the current webpage, having the same header segment. The computer system can also update the overall quality score of the website to reflect a quantity of points that the score can be increased by based on resolving the issue across all the webpages.

On the other hand, the website owner can decide that "Menue" is the correct spelling. Thus, the website owner can select an option that indicates the issue as being resolved because it is not actually an issue. Selecting this option can cause the computer system to no longer identify this issue for all the webpages having the same header segment. Selecting this option can also cause the computer system to update the overall quality score of the website to reflect a quantity of points that the score can be increased by based on resolving the issue across all the webpages.

The change can also include adding a caption to image data (optional block 246). For example, a missing caption issue can be identified in a page content segment of a webpage having a video. The website owner can view the video in the page content segment of the webpage and decide whether the video is missing a caption and/or needs a caption. If a caption should be in the paten content segment, the website owner can manually add the caption. The website owner can then select an option (such as a button) that causes the computer system to add the same caption to every other webpage having the same page content segment. Manually adding the caption can also cause the computer system to automatically perform the same action in the other webpages having the same segment. In some implementations, the website owner can also be presented with a suggestion for a caption that can be added. The website owner can select this suggestion, which can cause the computer system to add the suggested caption to every webpage, including the current webpage, having the same page content segment. The computer system can also update the overall quality score of the website to reflect a quantity of points that the score can be increased by based on resolving the issue across all the webpages.

As described in reference to the optional block 244, the website owner can also view the page content segment and decide that the missing caption issue is not actually an issue. The website owner can select an option that indicates the issue as being resolved. Selecting this option can cause the computer system to no longer identify this issue for all the webpages having the same page content segment. Selecting this option can also cause the computer system to update the overall quality score of the website to reflect a quantity of points that the score can be increased by based on resolving the issue across all the webpages.

The change may include deleting duplicative content (optional block 248). For example, a duplicate content issue can be identified in a footer segment of a webpage. The website owner can view the footer segment of the webpage and decide whether the content is actually being repeated (in the webpage and/or across webpages). The website owner can manually delete the duplicate content. The website owner can then select an option (such as a button) that causes the computer system to remove that same duplicate content in every other webpage having the same footer segment. Manually deleting the duplicate content can also cause the computer system to automatically perform the same action in the other webpages having the same segment. In some implementations, the website owner can also be presented with a suggestion to delete the content. The website owner can select this suggestion, which can cause the computer system to delete the duplicate content in every webpage, including the current webpage, having the same footer segment. The computer system can also update the overall quality score of the website to reflect a quantity of points that the score can be increased by based on resolving the issue across all the webpages.

As described in reference to the optional block 244, the website owner can also view the footer segment and decide that the duplicate content is not actually an issue. The website owner can select an option that indicates the issue as being resolved. Selecting this option can cause the computer system to no longer identify this issue for all the webpages having the same footer segment. Selecting this option can also cause the computer system to update the overall quality score of the website to reflect a quantity of points that the score can be increased by based on resolving the issue across all the webpages.

The change may also include fixing a broken link (optional block 250). For example, a broken link issue can be identified in a metadata segment of a webpage. The website owner can view the metadata segment of the webpage and decide whether the link is actually broken. The website owner can manually update the link. The website owner can then select an option (such as a button) that causes the computer system to update the same link in every other webpage having the same metadata segment. Manually updating the link can also cause the computer system to automatically perform the same action in the other webpages having the same segment. In some implementations, the website owner can also be presented with a suggestion to update the broken link. The website owner can select this suggestion, which can cause the computer system to implement the suggested change to the broken link in all the webpages, including the current webpage, having the same metadata segment. The computer system can also update the overall quality score of the website to reflect a quantity of points that the score can be increased by based on resolving the issue across all the webpages.

As described in reference to the optional block 244, the website owner can also view the metadata segment and decide that the link is not broken and thus is not actually an issue. The website owner can select an option that indicates the issue as being resolved. Selecting this option can cause the computer system to no longer identify this issue for all the webpages having the same metadata segment. Selecting this option can also cause the computer system to update the overall quality score of the website to reflect a quantity of points that the score can be increased by based on resolving the issue across all the webpages.

The example changes described in the optional blocks 244-250 are non-exhaustive. One or more other changes can be determined, suggested, and/or performed using the disclosed techniques.

Optionally, and as described in reference to the blocks 244-250, the computer system can update the overall quality score of the website in block 252. The computer system may also update any one or more information, scores, and/or output about the website that can then be presented to the website owner at the client computing device.

One or more blocks in the process 200 can be performed by services (e.g., engines, applications, modules) of the computer system that are configured to automatically determine segments for the website based on the segment criteria and apply the segments to all webpages for that website. The computer system can, for example, include an analyzer service that is configured to listen for crawl done events from a crawler service of the computer system. Based on the crawl done events, the analyzer service can analyze all the webpages for the website to automatically determine the segments therein. If new segment definitions, such as the segment criteria, are discovered, they can be stored (for example, in the data store 106 described in FIG. 5). Sometimes, portions of the segments can also be copied into a local memory storage for easy and quick retrieval for future processing. If segment definitions, such as the segment criteria, already exist, then any subtrees that match the existing segment definitions on a webpage can be skipped in order to make processing more efficient and avoid detection of the same segment more than once in the webpage. The computer system can include another service, such as an application service, that can listen for events in the computer system that indicate a webpage resource has been changed. Once a change is identified, the application service can apply the new segment definitions for the corresponding website to the webpage. Results of applying the new segment definitions to the webpage can be recorded as an aspect of the page resource.

Figure 3:
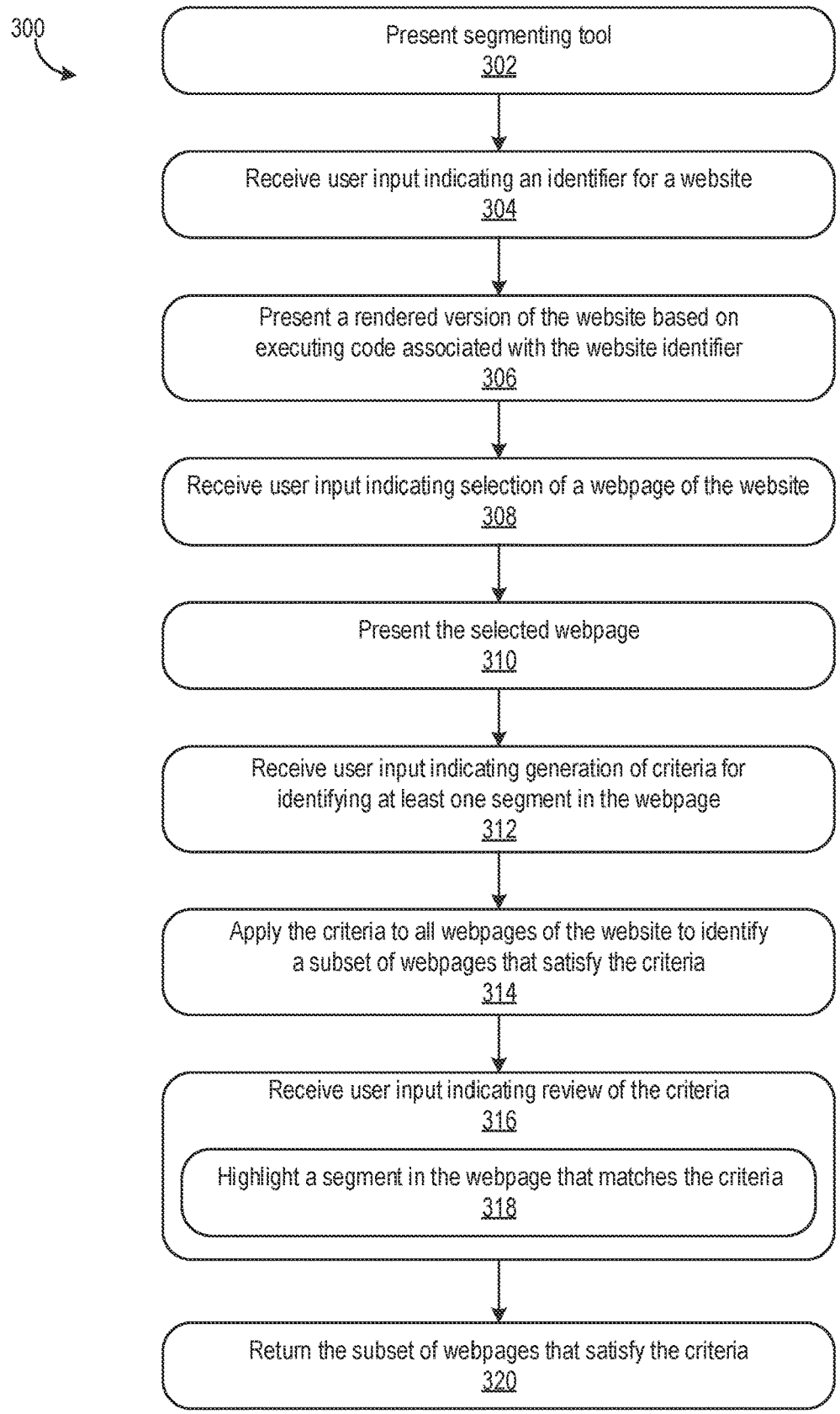
FIG. 3 is a flowchart of a process for generating segment criteria.

FIG. 3 is a flowchart of a process 300 for generating segment criteria. A user, such as the developer associated with the web analysis server system 102 described throughout this disclosure, can provide input at a client computing device for identifying different types of segments in their website. The developer may create, review, update, and/or delete segment criteria at the client computing device. A computer system can then generate the segment criteria based on the user input from the developer. In some implementations, the website owner may also define segment criteria.

The process 300 can be performed by the computer system 102. The process 300 can also be performed by one or more other computing systems, devices, computers, networks, cloud-based systems, and/or cloud-based services. For illustrative purposes, the process 300 is described from the perspective of a computer system.

Referring to the process 300, the computer system can present a segmenting tool to the developer in block 302.

The segmenting tool can include one or more GUI displays that can be presented at the client computing device. The GUI displays can include selectable options and graphical elements that can be used, by the developer, to generate/ determine, create, update, and/or modify segment criteria. The GUI displays can also include selectable options and graphical elements that can be used, by the developer, to view information about segments, types of segments, and/or categories of segments in any website. Refer to FIGS. 6-10 for additional discussion about the GUIs that can be presented at the client computing device.

In block 302, the segmenting service can be presented at the client computing device. For example, the segmenting service can be presented as a webpage in a web browser of the client computing device. Refer to FIGS. 6-9 for additional discussion about the GUIs for generating segment criteria.

In block 304, the computer system can receive user input indicating an identifier for a website. The segmenting tool can include an input field that can be designated for receiving URLs or other identifiers for a website. The developer can input, into this field, a particular URL or other unique identifier for a website that the developer wishes to segment. The developer can also press a selectable option, such as a button, that causes the inputted identifier to be transmitted from the client computing device to the computer system. Hence, in block 304, the computer system receives the user input.

The computer system can present a rendered version of the website based on executing code associated with the website identifier (block 306). As described in FIGS. 1-2, the computer system can retrieve code for the website from one or more web servers using the website identifier. Once the computer system has the code, the computer system can locally execute and interpret the code to render webpages of the website. The webpages can be rendered as if they are being presented at the client computing device or other user device. In other words, the webpages can be rendered as they would appear to an end user who accesses the website through a web browser at their user device (e.g., mobile phone, smartphone, computer, laptop, tablet, etc.), although the rendering can be performed by a "headless" web browser that does not actually present content on a display device.

The rendered version of the website can be presented in the GUI display of the segmenting tool concurrently with one or more selectable options that can be used, by the developer, to define segment criteria for that website (e.g., to define a beginning and end of code that comprises a segment). The developer can review the website, or a particular webpage of the website, while defining the segment criteria. The developer can therefore create, update, and/or modify the segment criteria at the same time that they review and visualize various aspects of the website.

The computer system can also receive user input indicating selection of a webpage of the website that is rendered in block 308. The developer can select the particular webpage by inputting a webpage identifier into an input field presented in the GUI display concurrently with the rendered version of the website. The developer can also select an option to view one of existing segments in webpages of the website. This selectable option can be presented in the GUI display concurrently with the rendered version of the website. Webpage identifiers can also be listed and presented in the GUI display concurrently with the rendered version of the website. Thus, the developer can also select or click on any of those webpage identifiers in block 308.

In some implementations, the developer can also navigate the website that is presented in the GUI display as if the developer is navigating the website as an end user at another user device. Therefore, the developer can select one or more options in the rendered website, such as tabs on a menu or embedded links in body text, to navigate to a particular webpage of the website.

In block 310, the computer system can present the selected webpage in the GUI display. The computer system can update the GUI display by replacing the previous rendering of the website, which can be a rendering of a homepage of the website, with a rendering of the selected webpage. The selected webpage can still be presented in the GUI display concurrently with the selectable options for generating the segment criteria.

Figure 6:
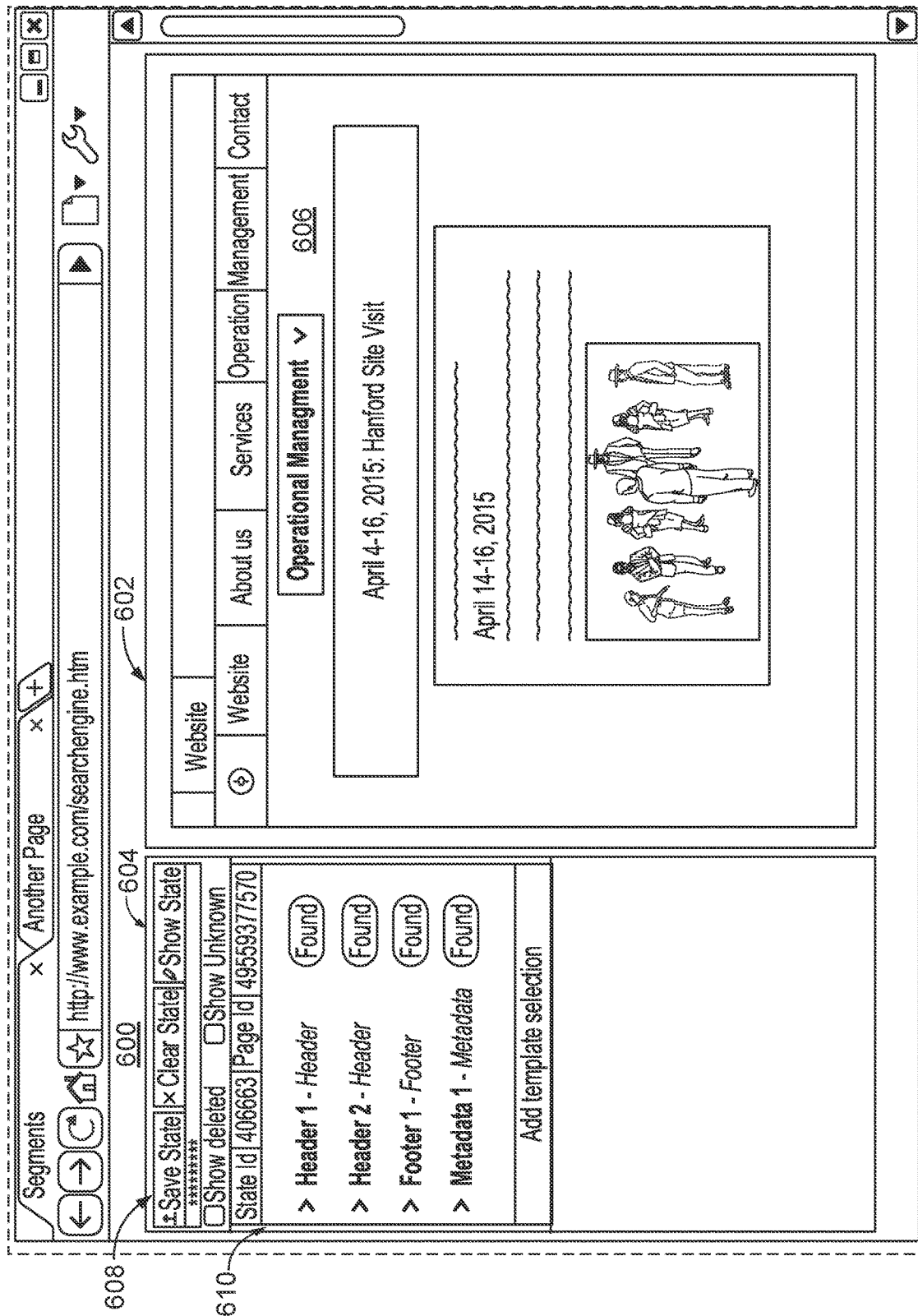
FIG. 6 is an example GUI for generation of segment criteria that a web analysis server system can use to identify segments in webpages of a website.
Figure 7:
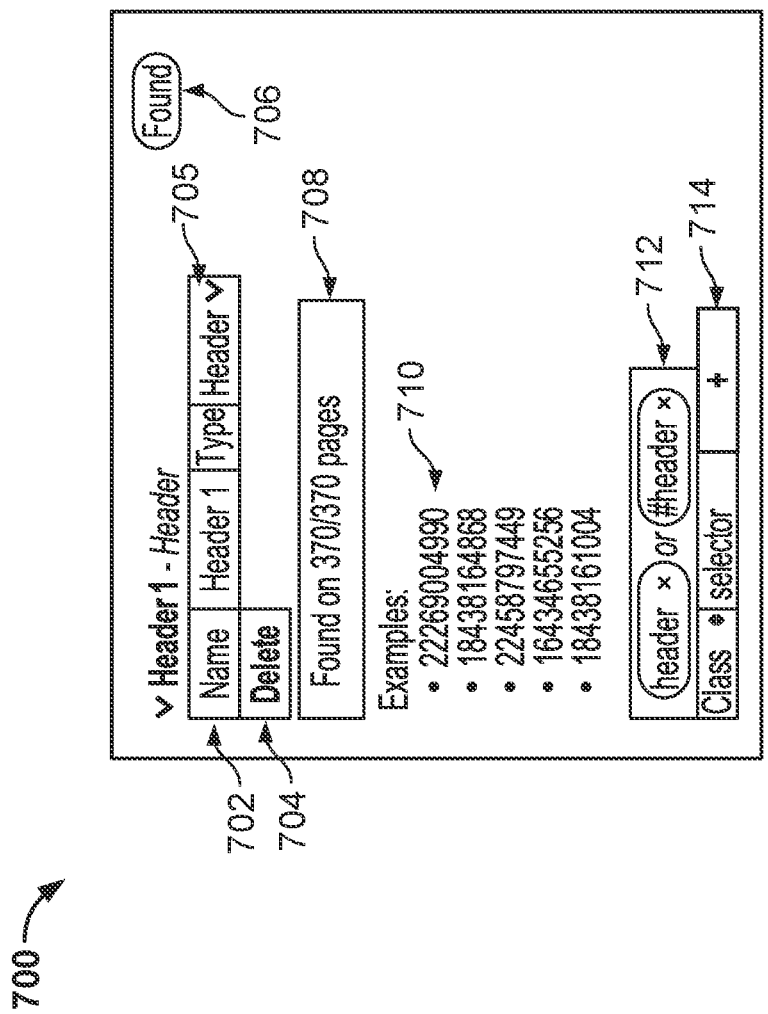
FIG. 7 is an example segment criteria that can be presented in a GUI.

The computer system can also receive user input indicating generation of criteria for identifying at least one segment in the webpage (block 312). Refer to FIGS. 6-7 for additional discussion about generating the segment criteria. In brief, the developer can create, modify, update, and/or delete criteria for one or more types of segments and/or one or more categories of segments.

The segment categories can include headers, footers, metadata, and page content. In some implementations, the page content category can be used to identify all content in the webpage that is not defined as a header, footer, or metadata (the remaining content classified itself as a "segment"). One or more other segment categories can also be determined or otherwise defined by the computer system and/or the developer. The segment types can include variations on each of the segment categories. For example, in the headers category, the developer can define three different types of headers—header 1, header 2, and header 3. Each type of header can have different criteria for defining the header. As an illustrative example, header 1 can be defined as a menu bar on a top portion of the webpage that has selectable drop down options. Header 2 can be defined as a title that appears beneath the menu bar on the webpage. Header 3 can be defined as a side bar that has selectable links. Although all of these segments are part of the same category (headers), they are each defined as different types of headers.

Each type of header can be defined by unique segment criteria. Thus, the computer system can identify a subset of webpages that satisfy the criteria for header 1 (e.g., that include a portion of code that satisfies the criteria), another subset of webpages that satisfy the criteria for header 2, and another subset of webpages that satisfy the criteria for header 3. Each of the subsets of webpages can include some of the same webpages (e.g., one webpage can have both header 1 and 3 but not header 2). Each of the subsets of webpages can also include different webpages (e.g., none of the webpages have all headers 1, 2, and 3). In some implementations, the website owner can also define a segment criteria that includes all headers 1, 2, and 3. The computer system can then identify a subset of webpages that include all headers 1, 2, and 3. One or more other variations on the segment criteria are possible.

Accordingly, the computer system can apply the criteria to all webpages of the website to identify a subset of webpages that satisfy the criteria (block 314). Refer to FIGS. 11A-B for additional discussion about identifying webpages that have the same segments.

Although not depicted in FIG. 3, the computer system can also present the subset of webpages in the GUI display (e.g., as a list), concurrently with the rendered version of the webpage. As a result, the developer can select and toggle between webpages in the subset of webpages, which can be beneficial to review particular segments in each of the webpages in the subset. This can also be beneficial to ensure that the correct segments were identified in each of the webpages in the subset. Moreover, this can be beneficial to assist the website owner in further refining, updating, or otherwise modifying the segment criteria.

The computer system can receive user input indicating review of the segment criteria in block 316. As described above, a list of webpages in the subset of webpages can be presented in the GUI display. The developer can select or click on any of the webpages in the list to navigate to that webpage and view the webpage's compliance with the segment criteria. In other words, the developer can review whether a segment was identified in the webpage for matching or satisfying the segment criteria.

The developer can also hover over (or select) any of the segment criteria that is presented in the GUI display to see whether a corresponding segment is identified in the webpage that is currently presented in the GUI display. In such a scenario, the computer system can highlight the segment in the currently presented webpage that corresponds to or matches the segment criteria, for example, by visually identifying a portion of a visual presentation of the currently presented webpage that corresponds to the segment (block 318). Some webpages of the website may not satisfy the segment criteria, which means those webpages do not have a matching segment. The developer can currently be viewing one of those webpages in the GUI display. When the developer hovers over the segment criteria and no matching segments are highlighted in the webpage, the developer can determine (i) whether to update the segment criteria so that a matching segment can be identified in the webpage and/or (ii) that the segment criteria is correct and that the webpage does not have (and is not support to have) the matching segment. Therefore, the developer can review, update, and/or modify the segment criteria accordingly.

Figure 8:
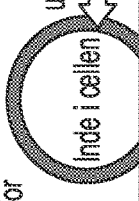
FIG. 8 is an example GUI for displaying header segmentation of a webpage in a website.
Figure 9:
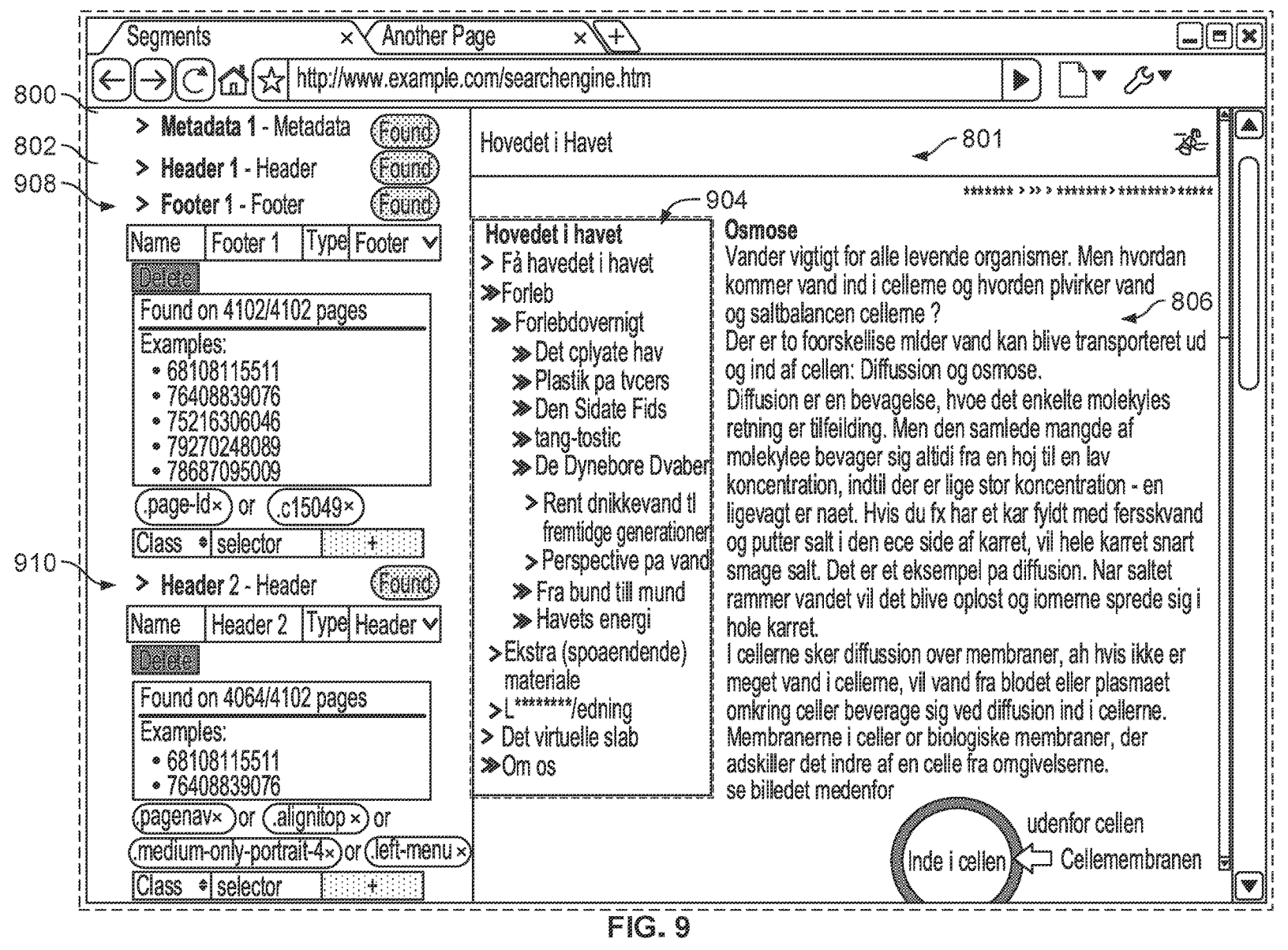

The matching segment can be represented/displayed in an indicia, such as a color, that is different than other segments or elements in the webpage. As an illustrative example, the matching segment can be displayed in a filled-in green box. As another example, the matching segment can be displayed with a red box or other colored box surrounding the segment (and the inside of the box may not be filled in with another color). The highlighting can easily direct the website owner's attention to the matching segment in the webpage. After all, a webpage can be crowded with many segments. Highlighting the matching segment can be beneficial to quickly and easily assist the website owner in identifying and reviewing that segment. Highlighting the matching segment can also be beneficial to verify that meaningful content is identified by the computer system as satisfying the segment criteria. The developer can toggle between other webpages of the website to also verify that meaningful content is being identified on those webpages by the computer system and based on the segment criteria. If meaningful content is not being identified, the developer can provide additional user input at the client computing device that can indicate one or more modifications to the segment criteria. Refer to FIGS. 8-9 for additional discussion about highlighting matching segments in the presented webpage.

The computer system can return the subset of webpages that satisfy the criteria (block 320). Returning the subset of webpages can include providing the list of webpages in the subset to the client computing device to be presented in the GUI display concurrently with the rendered version of the webpage. As described above, the developer can then select any of the webpages in the list to toggle between the webpages and verify identification of segments by the computer system based on the segment criteria. The developer can continue to modify, update, and/or generate the segment criteria. The block 320 can also be performed at one or more other times in the process 300. For example, the block 320 can be performed as part of or after block 314.

In some implementations, returning the list of webpages can also include storing the list in a data store (e.g., the data store 106). The list of webpages can then be retrieved for future use and/or processing.

In some implementations, the developer may review the webpage in block 316 and decide that the segment criteria is not defined accurately. After all, the computer system may not be identifying a particular segment in the webpage based on the segment criteria. To determine how to update the segment criteria, the developer can open and review HTML code for the webpage. The developer can search for attributes in the particular segment that should be identified by the computer system when using the segment criteria. The developer can then modify the segment criteria to include those attributes. In some implementations, the developer can use a node picker to inspect specific elements (e.g., a header) in the HTML code to determine what attributes should be included in the segment criteria. The developer can update the segment criteria accordingly, save the updated segment criteria, and then the computer system can repeat block 314, which is applying the criteria to all the webpages to identify webpages that satisfy the criteria. The process 300 can repeat until the developer is satisfied with the segment criteria and saves that criteria. The process 300 can also be performed whenever the developer desires to generate, update, and/or modify segment criteria for a website.

FIG. 4 is a flowchart of a process 400 for training a machine learning model to identify segments in webpages of a website. The process 400 can be performed using one or more machine learning techniques, including but not limited to unsupervised learning using shingle statistics (e.g., refer to the process 1100 in FIGS. 11A-B). The process 400 can be performed by the computer system 102. The process 400 can also be performed by one or more other computing systems, devices, computers, networks, cloud-based systems, and/or cloud-based services. For example, model training can be performed by a remote computing system that is configured to train models. The remote computing system can be different and/or separate from the computer system 102. The trained model can be stored in a data store (e.g., the data store 106) and then deployed at the computer system 102 for runtime use. For illustrative purposes, the process 400 is described from the perspective of a computer system.

Referring to the process 400, the computer system can receive a training dataset in block 402. The training dataset can be stored in the data store. The training dataset can also be generated by another computing system and provided to the computer system in block 402. The training dataset can include at least one website that is rendered as if it is presented at a client computing device (block 404). In some implementations, the at least one website can be a particular website of a website owner who uses the services provided by the computer system. In some implementations, the training dataset can include at least one rendered websites that is different than the website of the website owner.

The training dataset can also include identifications of segments across the rendered website (block 406). The segment identifications can be automatically made by the computer system. The segment identifications can also be manually annotated by a relevant user. The segment identifications can include correlations between variations of segment criteria and data associated with different segments in the at least one rendered website.

The computer system can train a model to (i) identify similar segments across all webpages of the rendered website and (ii) group the webpages having the similar segments (block 408). The computer system can train the model based on identifying matching identifiers or other attributes in an HTML structure of the website DOM (block 410). For example, the model can be trained to go to a leaf level of the DOM and to look for matching elements or attributes across different webpages of the website. The model can be trained, for example, to identify matches based on assessing identifiers, such as class identifiers, tags, etc., in the HTML structure of the DOM. As an illustrative example, any HTML element having a "Header" tag can be grouped into a header segment.

Thus, the model can be trained to identify and compare attributes and elements in the HTML structure of the website to identify commonalities between those attributes and elements. The model can then be trained using one or more rules to group segments (e.g., headers, footers, metadata, and all other page content) in the website based on the identified commonalities. The model can generate output of the grouped segments.

Refer to FIGS. 11A-B for additional discussion about training the model. Thus, the process described in FIGS. 11A-B can be used to train the model. The process described in FIGS. 11A-B can also be performed by the model once the model is trained and applied during runtime use.

As described above, the model can be trained based on the particular website of the website owner. The rules can thus be adapted to support the needs of the website owner for the particular website. User-defined criteria and/or modifications to the criteria that are made during runtime can then be used by the computer system to improve the model. Therefore the model can be continuously trained to improve model accuracy.

Once training is done, the model can be outputted by the computer system in block 412. Outputting the model can include storing the model in the data store. Outputting the model can also include locally storing the model so that it can be retrieved and applied quickly during runtime use.

Figure 5:
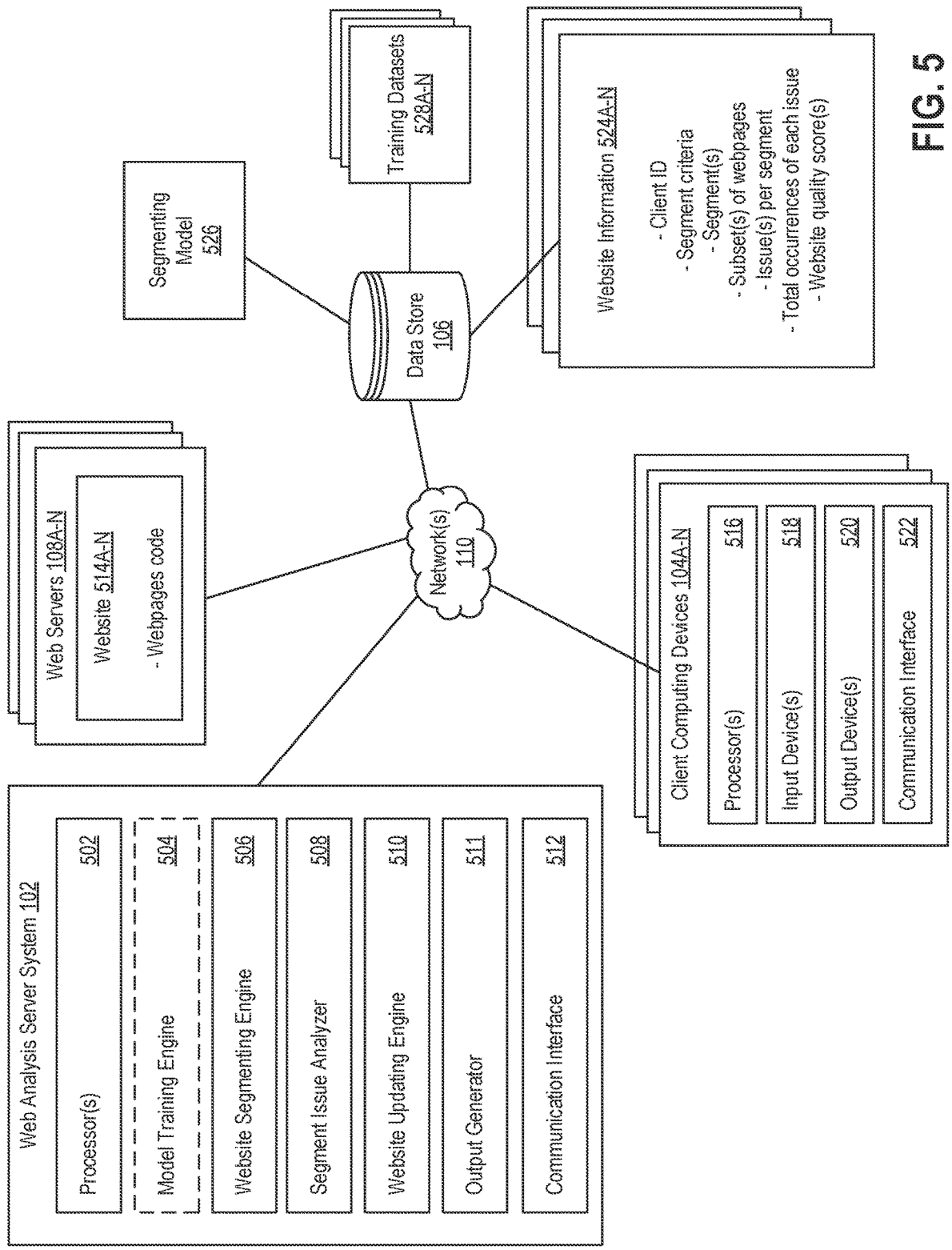
FIG. 5 is a system diagram depicting one or more components that can perform the techniques described herein.

FIG. 5 is a system diagram depicting one or more components that can perform the techniques described herein. As described herein, the web analysis server system 102, the client computing devices 104A-N, data store 106, and the web servers 108A-N can be in communication via the network(s) 110.

In brief, the web analysis server system 102 can be any type of computing system, such as a computer or network of computers, and/or a cloud-based computing system and/or service. The client computing devices 104A-N can be any type of user device or computing device, including but not limited to a computer, laptop, tablet, cellphone, mobile phone, and/or smartphone. Each client computing device 104A-N can be operated and used by a website owner, client, website operator, or other relevant user. The data store 106 can be any type of storage device, including but not limited to cloud storage, a data lake, and/or a data base. The data store 106 can maintain information about websites, such as the websites that are assessed by the web analysis server system 102. The web servers 108A-N can be any type of server system, such as a cloud-based server system. The web servers 108A-N can be configured to host websites. Accordingly, the web servers 108A-N can maintain code for webpages of websites 514A-N.

The web analysis server system 102 can be configured to analyze websites, determine quality scores for the websites, identify segments across the websites, identify issues in the websites, and provide a user, such as a website owner, with tools to assess and improve their website(s). Thus, the web analysis server system 102 can include a processor(s) 502, an optional model training engine 504, a website segmenting engine 506, a segment issue analyzer 508, a website updating engine 510, an output generator 510, and a communication interface 512.

The processor(s) 502 can be configured to execute instructions to perform one or more of the techniques described throughout this disclosure.

The model training engine 504 can be optionally part of the web analysis server system 102. In some implementations, the model training engine 504 can be part of a different computing system that can be remote from the web analysis server system 102. The model training engine 504 can be configured to train a segmenting model 526 using the techniques described in FIGS. 4 and 11A-B. The model training engine 504 can retrieve training datasets 528A-N form the data store 106 to train the segmenting model 526. The model training engine 504 can also continuously train the segmenting model 526 with user input received at the client computing devices 104A-N. Once the segmenting model 526 is trained, the segmenting model 526 can be stored in the data store 106. The segmenting model 526 can then be used by the website segmenting engine 506.

The website segmenting engine 506 can be configured to identify segments in webpages of a website. The website segmenting engine 506 can perform any of the techniques described herein, for example in the process 200 of FIGS. 2A-C, the process 300 in FIG. 3, and the process 1100 in FIGS. 11A-B. In brief, the engine 506 can retrieve webpages code for the website 514A-N from the web servers 108A-N. The engine 506 can render the website as it would appear at a user device by locally executing and interpreting the code. The engine 506 can also receive segment criteria from one of the client computing device 104A-N. In some implementations, the segment criteria can be generated at the client computing device 104A-N by a developer associated with the web analysis server system 102, stored in website information 524A-N in the data store 106, and then retrieved by the engine 506. The engine 506 can then assess the rendered webpages of the website to identify a subset of webpages that satisfy the segment criteria. The engine 506 can use the segmenting model 526 to identify the subset of webpages. The engine 506 can also perform the process 1100 in FIGS. 11A-B using a set of rules and/or other algorithms to identify the subset of webpages (thus, the engine 506 may not use the segmenting model 526 in some implementations). Any segments that are identified by the engine 506 can be stored in the website information 524A-N in the data store 106. The subset of webpages (and/or multiple subsets of webpages) can also be stored by in the data store 106.

The segment issue analyzer 508 can be configured to identify issues in segments of the webpages. The analyzer 508 can perform any of the techniques described herein, for example in the process 200 of FIGS. 2A-C, the process 300 in FIG. 3. The analyzer 508 can poll one or more other services of the web analysis server system 102 for issues that those services had identified at another time. The analyzer 508 can also retrieve any one or more issues that have been previously identified for a segment from the website information 524A-N in the data store 106. In some implementations, the analyzer 508 can be one of the services provided by the web analysis server system 102 that is configured to analyze the website and identify issues therein. The analyzer 508 can also be configured to count a total number of occurrences of an issue in the website. The count of total occurrences can be stored in the website information 524A-N in the data store 106. The count of total occurrences can later be retrieved, by the output generator 511, and presented to the website owner at the client computing device 104A-N.

The website updating engine 510 can be configured to update one or more portions of the website based on user input received at the client computing device 104A-N. As described herein, the website owner can provide a single user input to the client computing device 104A-N to fix one of the identified issues. The website updating engine 510 can then apply the user-defined fix to all webpages in the website that satisfy the segment criteria (and thus have the same segment with the issue). The engine 510 can also be configured to update an overall quality score of the website based on fixing the issue across all the webpages that satisfy the same segment criteria. In some implementations, the website updating engine 510 can be part of another system, such as a CMS system (not depicted).

Since the issue is linked to a particular segment in the webpage, the engine 510 can retrieve, from the website information 524A-N in the data store 106, the subset of webpages that the webpage is associated with. The engine 510 can then apply the fix to all the webpages in the subset of webpages. After all, all the webpages in the subset have the same segment and thus the same issue. Updates, changes, and/or fixes that are made to webpages of the website can be saved and stored in the website information 524A-N in the data store 106. The updated webpages code can also be transmitted to the web servers 108A-N to be stored for the particular website 514A-N.

The output generator 511 can be configured to generate output for presentation at the client computing devices 104A-N. Refer to FIG. 10 for additional discussion about the output. For example, the output generator 511 can receive segment criteria, segment(s), a subset of webpages, issue(s) per segment, total occurrences of an issue, and/or website quality score(s) from components of the web analysis server system 102 or the data store 106 and generate output including this information to be presented in one or more GUI displays at the client computing devices 104A-N. The generated output can also include information that can be rendered to present a user interface that includes one or more selectable options to filter the outputted information, view additional information, and/or respond to any of the issues that have been identified and outputted. The output generator 511 can then transmit the output to the client computing devices 104A-N to be presented to the website owner and/or other relevant users.

In some implementations, the generator 511 may also determine what type of output can be generated for a particular user, such as a website owner, a website developer, and/or a website operator. Each relevant user may have different access rights and/or privileges. Thus, not every relevant user may be allowed to view the same information about the website. The generator 511 can therefore retrieve client access rights and/or privileges that may be stored in the website information 524A-N in the data store 106 (not depicted) to determine what information can be presented to what user. Then, the generator 511 can create the appropriate output to be presented to the appropriate user at the client computing devices 104A-N.

The client computing devices 104A-N can be used by the website owner to review information about their website that is determined by the web analysis server system 102. This information can be used to identify issues in the website, assess quality of the website, and improve the website. The client computing devices 104A-N can deploy software, applications, or other services that are provided by the web analysis server system 102 to be used by the website owner in analyzing their website(s).

The client computing devices 104A-N can each include a processor(s) 516, input device(s) 518, output device(s) 520, and communication interface 522. The processor(s) 516 can execute instructions that cause the client computing devices 104A-N to perform one or more of the techniques described herein. The input device(s) 518 can include any type of device that can be used to provide input, by the website owners, to the client computing devices 104A-N. The input device(s) 518 can include but are not limited to keyboards, microphones, mice, and/or touchscreen displays.

The website owner can provide input via the input device(s) 518 such as input to view particular information that can be presented in a GUI display at the client computing devices 104A-N. Moreover, the website owner can provide input via the input device(s) 518 to implement one or more changes that address issues across a subset of webpages that satisfy the segment criteria.

The output devices(s) 520 can include any type of device that may provide output or otherwise display information to the website owner at the client computing devices 104A-N. The output device(s) 520 can include but is not limited to touchscreens, other types of display screens, speakers, headphones, and/or other types of devices for presenting information. The output device(s) 520 can display information, in a GUI display, such as the segment criteria, the subset of webpages that satisfy the segment criteria, different segments, issues associated with webpages in the subset of webpages, total occurrences of each issue, and/or quality scores for individual webpages, the subset of webpages, and/or the website. The output device(s) 520 can also display selectable options for actions that can be taken in response to information presented at the client computing devices 104A-N. The selectable options can include but are not limited to buttons and other elements used to create the segment criteria, filtering information presented at the client computing devices 104A-N based on segment type, segment category, and other filtering options, checking one or more of the identified issues, and/or implementing a change across the subset of webpages to fix an identified issue.

Finally, the communication interfaces 512 and 522 can be configured to provide communication between the components described herein.

FIG. 6 is an example GUI 600 for selection of segment criteria that a system, such as the web analysis server system 102, can use to identify segments in webpages of a website. The segment criteria can be selected by a developer or other relevant user of the web analysis server system 102. In some implementations, the segment criteria can be user-selected by a website owner or other customer of the web analysis server system 102.

The GUI 600 can provide input fields, selectable options, and other HTML elements that can be used by the developer of the web analysis server system 102 to alert, delete, and/or create segments in the website. The GUI 600 can be loaded into a web browser at a user device of the developer. The GUI 600 can include a website rendering panel 602 and a side panel 604.

Webpages of a website can be rendered in the panel 602, such as example webpage 606. The developer can review the webpage 606 presented in the panel 602 to identify and review segments that are part of the webpage 606.

The side panel 604 can include a control pane 608 and a segment definition pane 610. Components in the panes 608-610 can be selected and modified by the developer (or the web analysis server system 102) to define the segment criteria. The control pane 608, for example, can include selectable options to save any changes that are made to the segment criteria by the developer. The pane 608 can include selectable options to "Save state," "Clear state," and "Show state." The state can represent all currently defined segment criteria for the particular website. By selecting "Save state," the web analysis server system 102 can save a current local state of the segments, which can overwrite any remote states that have been previously saved. By selecting "Clear state," the web analysis server system 102 can clear the current local state by retrieving (or re-downloading) and implementing the segments (and their corresponding segment criteria) from a data store, such as the data store 106. By selecting "Show state," the web analysis server system 102 can cause another GUI display to be presented in the web browser where the developer can copy their local state of the segments to share the local state and/or paste a copy of another stat of the segments to load into the GUI display 600.

When the developer selects any of the options, a status bar can temporarily appear in the pane 608. The status bar can remain hidden before any of the selectable options are selected by the developer. The status bar can include text that indicates a current status. The status bar can also appear in an indicia, such as a particular color, to attract the developer's attention to the current status. In the example of FIG. 6, the status bar includes text that says "State was successfully saved." The status bar is also green. This status can indicate that whatever changes have been made to the segment criteria in the segment definition pane 610 have been saved. Thus, the newly saved segment criteria can be used by the computer system to identify segments across the website.

The control pane 608 can also include a selectable option to "Show deleted." If the developer selects or clicks on this option, the GUI 600 can display a list of segment criteria that the developer has deleted. The list of deleted segment criteria can be presented in the segment definition pane 610, as an illustrative example. In some implementations, the pane 608 can also include a selectable option to "Show unknown." By selecting "Show unknown," the GUI 600 can be updated to display webpage content that is not associated with a segment such as a header, footer, or metadata.

The control pane 608 can further include an input field for "Site id" and an input field for "Page id." The developer can provide a site identifier and/or a webpage identifier in the respective input fields to be navigate the website. The "Site id" can be used by the web analysis server system 102 to identify what website to load and edit segments for. The "Page id" can be used by the web analysis server system 102 to identify what webpage to load into the website rendering panel 602. In the example of FIG. 6, the inputted webpage identifier corresponds to the webpage 606. The inputted website identifier corresponds to the website of the webpage 606.

The segment definition pane 610 can include a list of all the segments that have been defined by the developer and/or determined by the web analysis server system 102 (or by the website owner, in some implementations). The pane 610 can include a selectable option "Add template selection" that the developer can select to define a new segment (e.g., the segment criteria). In the example of FIG. 6, four types (e.g., names) of segments are defined for the website: "Header 1," "Header 2," "Footer 1," and "Metadata 1." Each of these types of segments are also categorized. "Header 1" and "Header 2" are categorized as headers (as depicted by the italicized "Header" text following "Header 1" and "Header 2"), "Footer 1" is categorized as a footer (as depicted by the italicized "Footer" text following "Footer 1"), and "Metadata 1" is categorized as metadata (as depicted by the italicized "Metadata" text following "Metadata 1"). Type and category can be used for filtering results, such as issues in the website, that are presented to the website owner (e.g., refer to FIG. 10).

Moreover, multiple types of a category of segments can be defined and presented in the pane 610. As an illustrative example, 5 types of headers can be identified, 3 types of footers can be identified, and 3 types of metadata can be identified. As described further throughout this disclosure, any content in the website that is not categorized and identified as one of the segment types can fall into a category of page content. In some implementations, anything that is not a header, footer, or metadata can be considered page content, which can also be analyzed, by the web analysis server system 102, for issues.

In some implementations, each webpage can have multiple of the segments defined in the segment definition pane 610. Webpages can also have different combinations of the segments defined in the pane 610. As described herein, each category of segments can also have multiple types of the segment, which can be the same or different per webpage.

Still referring to the segment definition pane 610, graphical elements can also be displayed next to each segment type that identifies whether the segment is found (by the web analysis server system 102) in the webpage 606 that is displayed in the website rendering panel 602. Thus, the web analysis server system 102 can analyze the webpage 606, and other webpages in the website, using the disclosed techniques to determine whether the segments defined and presented in the pane 610 appear in the webpage 606. In the example of FIG. 6, all four segments appear in the webpage 606 (and thus satisfy segment criteria for each of those four segments). As a result, the graphical elements displayed next to each segment type is a green round-edged rectangle with the text "Found." One or more other graphical elements can be used to visually depict whether or not the segment type is found in the webpage 606. For example, if a segment type is not found in the webpage 606, the graphical element can be a grey round-edged rectangle with the text "Not found." The graphical element may be any other type of shape, text, and/or indicia (e.g., color, pattern, etc.). In some implementations, if the segment type is not found in the webpage 606, then no graphical element may be displayed next to that segment type. Instead, the graphical element may only be displayed when the segment type is found/identified in the webpage 606.

As described further in reference to FIGS. 8-9, the developer can hover over any of the listed segments in the pane 610 to see whether a corresponding segment is found in the webpage 606. The developer can also click on or select any of the segments in the pane 610 to expand details about the segment (e.g., to view the segment criteria) and/or to edit/delete the criteria or other information associated with identifying that segment. The developer can also click on or select the arrow next to each segment to expand details about the segment and its criteria.

FIG. 7 is an example segment criteria 700 that can be presented in a GUI, such as the GUI display 600 in FIG. 6. For example, the developer can select "Header 1" in the segments definition pane 610 in the GUI display 600 of FIG. 6. By selecting "Header 1," "Header 1" expands to include additional details, such as the segment criteria 700, which is presented in the GUI display 600. Thus, the segment criteria 700 of FIG. 7 is an expanded block of information presented in the segments definition pane 610 beneath "Header 1." In some implementations, the segment criteria 700 can also be presented in another GUI display or a pop-out window.

Referring to the segment criteria 700 in FIG. 7, the segment criteria 700 is defined for segment type "Header 1." Graphical element 706 (e.g., refer to FIG. 6 for additional discussion) indicates that the segment type "Header 1" is found in the webpage that is presented in the website rendering panel 602 described in reference to FIG. 6. The developer can modify the name of "Header 1" using input field 702. The developer can type in or otherwise input a different name to represent the segment type "Header 1." "Header 1" can be a default name given by the web analysis server system 102 when a first header segment is identified across the webpages of the website. "Header 2," similarly, can be a default name given when a second header segment is identified, etc. The website owner can change these names to be more descriptive of the particular segments. For example, "Header 1" can be used to identify segments having a main menu at the top of every webpage. The developer can change the name "Header 1" to "Main Menu."

The developer can also change the category type of "Header 1" by selecting an option from dropdown menu 705. In FIG. 7, "Header 1" is identified as part of the "Header" category. The developer can select a category of footer, metadata, page content, and/or some user-defined category using the dropdown menu 705. One or more other categories can be presented in the dropdown menu 705. For example, the developer and/or the web analysis server system 102 can define one or more other categories, including but not limited to menu, title, social media, etc. When a new category is defined and used in the segment criteria 700, the web analysis server system 102 (and/or a machine learning model that is deployed by the web analysis server system 102 to identify webpages having the segment) can be trained to group webpages based on the newly defined category. Additional rules can be built and used by the web analysis server system 102 to identify webpages having the newly defined category of segments. Thus, the web analysis server system 102 can become smarter over time to identify particular categories of segments for a particular website.

The developer can also delete the "Header 1" segment by selecting "Delete" option 704. Selecting the option 704 causes the web analysis server system 102 to mark the "Header 1" segment for deletion. The web analysis server system 102 can, however, keep the "Header 1" segment (and its corresponding segment criteria) in the data store to ensure that the system 102 does not identify the "Header 1" segment in subsequent reviews/analysis of the website.

The segment criteria 700 can also include information 708, which can indicate how many webpages in the website have the "Header 1" segment. The information 708 can be updated every time that the web analysis server system 102 analyzed the website to identify segments using the segment criteria 700. Whenever the segment criteria 700 is updated/modified and/or new segments are created, the web analysis server system 102 can analyze the website again and re-compute or otherwise update the information 708. In the example of FIG. 7, the information 708 states "Found on 370/370 pages." Thus, during a last analysis of the website (before the developer made any modifications to the segment criteria 700), the web analysis server system 102 identified that all the webpages in the website contain the "Header 1" segment (and thus satisfy the segment criteria 700).

The segment criteria 700 can further include a block 710, which can be used to present webpage identifiers for other webpages that were identified as having the "Header 1" segment. The developer can select any of the webpage identifiers in the block 710 to load the respective webpage in the website rendering panel 602 described in FIG. 6. The developer can then review the loaded webpage, inspect a location of the "Header 1" segment on that webpage, and/or make one or more modifications to the segment criteria 700.

The segment criteria 700 can also include current selectors 712. The current selectors 712 can indicate one or more selectors that are used to define the "Header 1" segment. The current selectors 712 can include one or more default selectors. The developer can also add, delete, and/or modify the current selectors 712 by inputting custom selectors. The current selectors 712 can be depicted using CSS selector syntax. The current selectors 712 may also be depicted using one or more other user-friendly syntax. The developer can click on an "x" near each of the current selectors 712 to remove that selector from the segment criteria 700. Once removed, that selector may not be used to identify the segment across the website. In the example of FIG. 7, the current selectors 712 for the "Header 1" segment include "header or #header," which is shorthand for "element with tag name 'header'," and "element with 'id="header"'," respectively. A selector without punctuation (e.g., a period) or a hashtag (e.g., #), such as "header," is associated with HTML tags. A selector with punctuation (e.g., a period), such as ".header," is associated with classes. A selector with a hashtag, such as "#header," is associated with IDs.

The segment criteria 700 can also include an input field 714 for adding new selectors. The developer can select a type of selector and a value for that selector. The developer can then select or click the "+" button next to the input field 714 to add the new selector to the current selectors 712. The developer can select the type of selector by clicking on the dropdown option next to "Class." The types of selectors that the developer can choose from can include class, ID, and/or role. One or more other types of selectors can also be defined by the developer and/or the web analysis computer system 102. For example, the developer can create a selector type of "social media" and provide one or more values for the "social media" selector in the input field 714.

Once the developer adds selectors 712 using the input field 714, all the selectors 712 are represented with "OR" in between them. Therefore, a webpage may be identified using the disclosed techniques if it has at least one of the current selectors 712—the webpage does not have to have all of the current selectors 712. In the example of FIG. 7, any webpage having an HTML tag of "header" OR an ID of "#header" can be identified and presented in the block 710.

FIG. 8 is an example GUI for displaying header segmentation of a webpage in a website. GUI display 800 depicts a rendered webpage 801 for a website. The website and the webpage 801 can be different than the website and webpage described in FIGS. 6-7. In FIG. 8, segment definition pane 802 lists six segments that have been identified for the particular website of the webpage 801. The segments include "Metadata 1," "Header 1," "Footer 1," "Header 2," "Header 3," and "Header 4." The web analysis server system 102 has determined that all six segments appear in the webpage 801. Hence, each of the six segments includes a graphical element of a green rounded-rectangle with the text "Found."

The developer has selected the "Header 1" segment, which expanded in the segment definition pane 802 to include segment criteria 808. As described in reference to FIG. 7, the segment criteria 808 includes a list of selectable webpage identifiers for some of the other webpages of the website that also have the "Header 1" segment. Information is also presented in the segment criteria 808 indicating that the "Header 1" segment was "Found on 4085/4102 pages." Moreover, the segment criteria 808 indicates that a current selector for the "Header 1" segment is an element with tag name "header." Thus, when analyzing the website, the web analysis server system 102 can identify any webpage having an element with the tag name "header" as having the "Header 1" segment.

Since the developer selected the "Header 1" segment, a corresponding segment 804 is highlighted in the rendered webpage 801. All remaining content 806 of the webpage 801 is not highlighted. The segment 804 is surrounded by a box that is filled in with some indicia, such as a green color. This form of highlighting can be beneficial to easily and quickly direct the website owner's attention to the segment 804. Thus, the developer can determine whether the segment criteria 808 is appropriately defined so that the web analysis server system 102 identifies a correct, corresponding segment across all the webpages in the website. The developer can also select one of the listed webpage identifiers in the segment criteria 808 to toggle to viewing the corresponding webpage in the GUI display 800. The developer can view the corresponding webpage in the GUI display 800 to ensure that a correct segment is identified in that webpage based on the segment criteria 808. If a segment in the webpage 801 (or another webpage in the website) is identified that does not match the segment criteria 808 for the "Header 1" segment (e.g., the segment criteria 808 is intended to identify a menu title at the top of the webpage but the web analysis server system 102 actually identifies a side menu bar on one or more of the webpages), then the developer can decide to modify the segment criteria 808 so that a correct segment is identified when using the segment criteria 808. As described herein, the developer can modify the segment criteria 808 by changing a value for a selector type, removing one or more current selectors, adding a different type of selector and a corresponding value, etc.

FIG. 9 is an example GUI for displaying footer segmentation of a webpage in a website. The GUI display 800 described in FIG. 8 can be updated as shown in FIG. 9 based on one or more user input. Here, the developer has expanded the "Footer 1" segment in the segment definition pane 802 to view segment criteria 908. The developer has also expanded the "Header 2" segment in the pane 802 to view segment criteria 910.

As shown in the segment criteria 908, the "Footer 1" segment has been "Found on 4102/4102 pages." Multiple webpages other than the webpage 801 are listed, by their website identifiers, in the segment criteria 908. Thus, the developer can select any of the website identifiers to render the corresponding webpage in the GUI display 800 instead of the webpage 801. Here, the segment criteria 908 is also defined as an element with class ".page-id" or an element with an ID "#c15849."

As shown in the segment criteria 910, the "Header 2" segment has been "Found on 4064/4102 pages." Multiple webpages other than the webpage 801 are listed, by their website identifiers, in the segment criteria 910. One or more of the listed website identifiers can be the same as the website identifiers listed in the segment criteria 908 (which assumes that a webpage has both the "Footer 1" segment and the "Header 2" segment). Here, the segment criteria 910 is also defined using class type having values of ".pagenav or .align-top or .left-menu or .medium-only-portrait-4." Thus, any webpage having a class with a value of .pagenav or .align-top or .left-menu or .medium-only-portrait-4 can be identified as having the "Header 2" segment.

In the example of FIG. 9, the developer can hover over "Header 2" in the segment definition pane 802. Hovering over "Header 2" can cause the web analysis server system 102 to highlight a corresponding segment in the webpage 801 that is rendered in the GUI display 800. Segment 904 of the webpage 801 is highlighted and surrounded in a green box. The green box is also filled in with an indicia, such as a green color. The segment 904 can be a header that is defined by one or more of the current selectors described in the segment criteria 910. The segment 904 is a side menu in the webpage 801, and thus was accurately identified, by the web analysis server system 102, as the "Header 2" segment.

In some implementations, the segment definition pane 802 in the GUI display 800 presented and described in FIGS. 8-9 can be presented in a user interface for customers, such as website owners. As a result, the customers can define their own segments rather than, or in addition to, a developer defining segments for the customer's website.

In some implementations, the techniques described herein for defining segments can be used to identify and define various types of segments in a website. The disclosed techniques can be used to define segments for forms, social media buttons, menus, and other specific types of features or elements that may be added to a webpage. As an illustrative example, a customer can hire a polling company to generate a custom form for the customer's website. The customer (or a developer) can use the disclosed techniques to define a segment for the custom form. Accordingly, the customer can use the defined segment to grab information about the custom form and send it to the polling company. The polling company can use the received information to determine adjustments to the custom form and monitor effectiveness of the custom form.

FIG. 10 is an example GUI for displaying issues based on segments for a website. GUI display 1000 can be presented at the client computing device 104 once the web analysis server system 102 analyzes a particular website, identifies and groups webpages that satisfy one or more segment criteria, and determines issues associated with the groups of webpages. Thus, the GUI display 1000 can output information such as a list of issues identified across the website.

The GUI display 1000 can output information for a particular website of the website owner. The information can include an issues table 1008. In the example of FIG. 10, issues are presented in the table 1008 for website "examplesite.com." The GUI display 1000 presents selectable options for filtering what information is presented in the table 1008. Dropdown option 1002 allows the website owner to select one or more groups of webpages. When the website owner selects one or more of the groups, issues associated with the selected group(s) can populate the table 1008. The groups of webpages can include subsets of webpages that are identified by the website owner. The website owner can define groups for grouping together webpages in their website. The website owner can define as many groups as they desire. As an example, the website owner can define a group for all webpages that are product landing pages in the website. The website owner can define another group for all webpages that include contact information for products provided via the website. The groups can be defined based on URLs. The groups can also be identified by the web analysis server system 102 using grouping criteria that is generated by the website owner. In the example of FIG. 10, no group or groups of webpages have been selected. However, the website owner may select one group out of the groups presented in the dropdown option 1002 to view issues associated with the selected group in the table 1008.

Dropdown option 1004 allows the website owner to filter information presented in the table 1008 based on segment category. In some implementations, although not depicted in FIG. 10, another dropdown option can allow the website owner to filter information presented in the table 1008 based on segment type. For example, all segments of a "Header" type (e.g., Header 1, Header 2, Header 3, etc.) can be grouped into a "Header" category in the dropdown option. When the website owner selects the "Header" category, the table 1008 can be updated to include issues that are associated with Header 1, Header 2, Header 3, etc. segments. Similarly, all segments of a "Footer" type (e.g., Footer 1, Footer 2, Footer 3, etc.) can be grouped into a "Footer" category in the dropdown option, which the website owner can select to filter information presented in the table 1008. All segments of a "Metadata" type can also be grouped into a "Metadata" category in the dropdown option.

As described herein, the segment categories can include header, footer, metadata, and page content. Page content can include any portion of a webpage that is not identified as a header, footer, or metadata. In some implementations, page content can include segments of the webpage that are identified as being part of an unknown category. In yet some implementations, the page content can include any content in the webpage that does not have multiple occurrences (e.g., does not replicate) across the webpages of the website. Thus, the page content can be unique to each webpage. For example, a body of text in a portion of the webpage can be identified as page content and may not be replicated elsewhere in the webpage since each webpage can have a different body of text.

The website owner can select one or more categories from the dropdown option 1004. In the example of FIG. 10, the website owner has selected the "Header" and "Footer" categories. The website owner can then select "Apply filter" to cause the web analysis server system 102 to update the table 1008 to include information, such as issues, that is associated with only the "Header" and "Footer" categories.

If the website owner does not select any of the categories from the dropdown option 1004, then information associated with every potential segment category (including information associated with webpage content that is not a header, footer, metadata, or page content) can be presented in the table 1008.

Moreover, in some implementations, one or more other categories can be presented and selectable in the dropdown option 1004. The one or more other categories can include categories that are defined/created by the website owner, developer, other relevant user, and/or the web analysis server system 102, as described above. Additionally, categories that are presented in the dropdown option 1004 can vary depending on the particular website and/or the particular website owner. For example, "examplesite.com" may use default the segment categories of header, footer, metadata, and page content. However, another website by the same website owner can use custom segment categories that include menu, title, social media, body text, and multiple headers and/or footers. Therefore, when information is presented for a particular website in the GUI display 1000, the web analysis server system 102 can select the appropriate groups of webpages and/or segment categories to provide as filtering options in the dropdown options 1002 and 1004, respectively.

Dropdown option 1006 can allow the website owner to decide a "Site Target." The site target can indicate a level of accessibility compliance that the website can achieve and that the website owner would like to achieve. There can be multiple levels of compliance, such as level A, level AA, and level AAA. Each of the levels can be associated with different types of rules and/or policies that the website must comply with. Level AAA issues can include both level A and level AA issues. Moreover, level AA issues can include level A issues. The multiple levels of compliance can be defined according to known accessibility standards in the industry.

Each identified issue in the website can be associated with a level of accessibility compliance. Thus, when the website owner selects one or more of the levels of compliance in the dropdown option 1006, the resulting information presented in the table 1008 can be filtered to only issues that are associated with the selected levels of compliance. In the example of FIG. 10, the website owner has selected a site target of level A. Thus, only level A issues are displayed in the table 1008.

The website owner can review the table 1008 to view issues with their website, their conformance level, how difficult each issue may be to fix, what type of element in the webpage has the issue, how many occurrences of the issue across the website, how many points an overall quality score of the website can gain by fixing each issue, and a number of tasks set to fix each issue.

The table 1008 can include columns or attributes for "Issues" "Conformance," "Difficulty," "Responsibility," "Element type," "Occurrences," "Pages," "Points you can gain," and "Tasks." The website owner can also sort any of the information presented in the table 1008 based on "Conformance," "Difficulty," "Responsibility," Element type," "Occurrences," "Pages," and "Points you can gain." Sorting by any of these attributes can beneficially assist the website owner in prioritizing which issues to address and how to address them.

The "Issues" attribute can include descriptive text that briefly describes the identified issue. Each issue can also include a graphical icon that can indicate whether the issue is an actual issue, a potential issue, or a resolved issue. The graphical icon for an actual issue can be a red circle with an "!" inside the circle. In the example table 1008, all the identified issues include the graphical icon for an actual issue. Thus, the web analysis server system 102 might have identified that the listed issues are in fact issues and do not need to be verified by the website owner. Instead, the website owner can start a review process to resolve the issues. The graphical icon for a potential issue can be a yellow circle with a hazard symbol inside the circle. The graphical icon for a resolved issue can be a green circle with a checkmark inside the circle. One or more other graphical icons can be used to visually depict whether an issue is actual, potential, or resolved.

The "Conformance" attribute can indicate which level of accessibility compliance is associated with a particular issue. In the example of FIG. 10, the website owner filtered results in the table 1008 to only include issues associated with a level A conformance. Thus, all the issues presented in the table 1008 are associated with level A conformance.

The "Difficulty" attribute can indicate a level of difficulty in resolving a particular issue. Difficulty level can be predetermined by one or more components of the web analysis server system 102. When generating the table 1008, the web analysis server system 102 can simply pull/retrieve the predetermined difficulty levels for each of the issues from a data store or component of the system 102. Thus, the difficulty level may not have to be determined during runtime, which can improve processing efficiency and use fewer compute resources.

Difficulty can be represented by a graphical depiction as well as some text that is visually aesthetic and user-friendly. The website owner can use the "Difficulty" attribute to determine how to resolve an issue, who to assign the task(s) of resolving the issue, and/or how much time may be needed to resolve the issue.

The graphical depiction indicating difficulty can include four circles. The circles can be filled in with one or more colors that correspond to a difficulty level of fixing the issue. At a minimum, each issue has a first circle filled in. The first circle can be filled in green to represent an easy fix, or a "Beginner" difficulty level. "Beginner" can thus be displayed beneath the four circles for an issue that only has the first circle filled in.

A second circle can be filled in along with the first circle to represent an "Intermediate" difficulty level. "Intermediate" can thus be displayed beneath the four circles for an issue that only has the first and second circles filled in. The first circle remains green and the second circle can be filled in dark orange.

A third circle can be filled in along with the first and second circles to represent an "Advanced" difficulty level. "Advanced" can thus be displayed beneath the four circles for an issue that has the first, second, and third circles filled in. The first circle remains green, the second circle remains dark orange, and the third circle can be filled in light orange.

A fourth circle can be filled in along with the first, second, and third circles to represent an "Expert" difficulty level. "Expert" can thus be displayed beneath the four circles for an issue that has the first, second, third, and fourth circles filled in. The first circle remains green, the second circle remains dark orange, the third circle remains light orange, and the fourth circle can be filled in red. It shall be appreciated that one or more other colors can be used to fill in the four circles and thus represent a difficulty level associated with fixing a particular issue.

The "Responsibility" attribute can indicate a category of activity that the issue is associated with. Example responsibilities include "Development," "Content writing," "UX design," and "Visual design." Resolving each issue can be led by a primary party or relevant user who is associated with the website. That primary party can be responsible for managing resolution of the issue. Therefore, the "Responsibility" attribute can indicate which type of relevant user should be the primary lead for resolving the issue.

The "Development" responsibility can indicate that an associated issue is primarily related to development activity of the website and thus a user with development expertise should be responsible for the issue. Issues that have "Development" responsibility may involve one or more changes that can be made to HTML elements or structure of the website, although the issue may also require changes form one or more other types of responsibilities. For example, the first issue presented in the table 1008 is entitled "Page language has not been identified." Fixing this issue can require a relevant user with web developing experience to identify a page language for the associated webpage. Another example issue can be identified as "Container element is empty." This issue also has a "Development" responsibility because fixing this issue can require someone with web development skills/expertise to perform actions such as removing the container element or populating the container element with content. Such actions can be made to an HTML structure of the associated webpage.

The "Content writing" responsibility can indicate that an associated issue is related to content development activity of the website, and thus a user with content writing expertise should be a primary lead for the issue. Issues that have "Content writing" responsibility may involve one or more changes that can be made directly to content in a particular webpage or otherwise changes that are associated with content displayed in the particular webpage. For example an issue can be entitled "Page has no title." This issue has "Content writing" responsibility and thus can require a relevant user with content development skills to update and/or add a title to the particular webpage. As another example, an issue entitled "Link without a text alternative" can have the "Content writing" responsibility. Accordingly, a relevant user with content development skills can be tasked with adding alternative text to the link in the webpage. Such a change can be made to HTML structure for the webpage. Such a change can also be made directly in the webpage, in some implementations.

The "Element type" attribute can indicate what type of element in the webpage is associated with the issue. One or more types of elements as defined in HTML structure, CSS, and/or JavaScript for the particular webpage can be identified by the "Element type" attribute. For example, the "Element type" attribute can include but is not limited to "Forms," "Images," "Headings," "Links," and "Other." One or more other element types can also be identified. For example, a second issue in the table 1008 is identified as "Form field is not labelled." This issue is identified as having an "Element type" of "Forms." After all, the issue pertains to fixing a form field in the webpage.

The "Occurrences" attribute can indicate how many times a particular issue appears across the website. As described herein, the web analysis server system 102 can count a total of times the issue is identified across the website. This count can be presented in the table 1008 as the "Occurrences" attribute. For example, the second issue in the table 1008 is identified as "Form field is not labelled." This issue appears eighty times across the entire website.

The "Pages" attribute can indicate a quantity of webpages in the website where a particular issue is identified. When the web analysis server system 102 counts the total occurrences for the particular issue, the system 102 can also identify how many webpages include that issue. The issue can appear multiple times in one webpage, in some implementations. As an example, the second issue in the table 1008, "Form field is not labelled," appears in 30 webpages of the website, even though this issue occurred eighty times across the entire website. Thus, one or more of the thirty webpages have multiple instances of this issue. Moreover, as shown in FIG. 10, the issues in the table 1008 are sorted based on pages, from most amount of pages having an issue to least amount of pages having an issue.

As described herein, once the website owner or other relevant issue resolves, such as fixes, an issue for one of the webpages, the web analysis server system 102 can automatically apply a same fix to all other webpages having the same issue. Therefore, in the example of the second issue, if the relevant user labels the form field in one of the eighty pages that have this issue, the web analysis server system 102 can subsequently and automatically label the form field in each of the remaining eight pages having this issue. Thus, the second issue can be resolved across all eighty webpages in the website that have this issue. This can be beneficial to quickly, efficiently, and accurately improve the website, which can increase a quality score of the website and improve user experiences with the website.

The "Points you can gain" attribute can indicate how many points a quality score for the website would increase if the website owner corrects an associated issue. The "Points you can gain" can indicate a total amount of points the quality score of the website would increase for resolving the issue across all webpages in the website. For example, the first issue in the table 1008 can occur fifty-nine times across the website and in fifty-nine webpages of the website. Thus, each webpage in the website can have one occurrence of the first issue. When the website owner fixes the first issue in one of the fifty-nine webpages, the web analysis server system 102 can implement this fix across the remaining fifty-eight webpages having the first issue. Once the issue is fixed across the fifty-nine webpages, the website's overall quality score may be increased, by the web analysis server system 102, by 1.51 points.

In some implementations, the website's overall quality score can incrementally increase by a smaller quantity of points as an issue is fixed per webpage. For example, as soon as the website owner fixes the first issue on one webpage, the web analysis server system 102 can increase the website's overall quality score by a portion of the 1.51 points that can be gained, where that portion corresponds to 1/59 of the 1.51 total points that can be added to the quality score.

The "Tasks" attribute can indicate information about tasks that are or may be performed to resolve/address each issue. This attribute can include information such as a quantity of tasks that have been assigned or otherwise determined to resolve/address an issue. The tasks can include information about how an issue may be resolved and by whom. The website owner or another relevant user can define as many or as few tasks as they desire to resolve/address the issue. Therefore, the tasks can be manually created by the website owner by selecting one or more options, buttons, or icons in the "Tasks" attribute. A pop-out window can be presented in the GUI display 1000 that allows the website owner to input information to define (or update, edit, and/or delete) a task for the issue. In some implementations, a new GUI display can be presented to the website owner instead of the pop-out window.

The information presented as the "Tasks" attribute can be used to identify and delegate actions that can be performed to resolve an issue. The tasks can be assigned and/or delegated to a variety of relevant users who have access to the website. For example, the tasks can be assigned to employees (e.g., web developers) of a company that uses the website for the company's business.

This attribute can also include one or more selectable options to create tasks, view tasks, and/or resolve tasks. For example, the website owner can select an option that includes text indicating a quantity of tasks to view all the tasks that have been generated for the issue. In the table 1008 in FIG. 10, two tasks have been identified for the first issue. Therefore a selectable option in the "Tasks" attribute includes text that states "2 tasks."

As another example, the website owner can select one or more other icons (e.g., options) presented as the "Tasks" attribute to edit one or more of the tasks for a particular issue.

Additionally, any of the attributes in the table 1008 can be predetermined by one or more components of the web analysis server system 102. When generating the table 1008, the web analysis server system 102 can simply pull/retrieve any of the attributes for each of the issues from a data store or component of the system 102. Thus, the attributes may not be determined during runtime, which can improve processing efficiency and use fewer compute resources. Results can be presented in the GUI display 1000 in real-time, thereby providing a faster, more user-friendly interaction for the website owner or other relevant user with the services provided by the web analysis server system 102.

FIGS. 11A-B is a flowchart of a process 1100 for identifying segments in webpages of a website. The process 1100 can be implemented as a runtime algorithm. A computer system can perform the process 1100 to automatically identify segments in a particular website. The process 1100 can be performed at predetermined times (e.g., multiple times a day, once a day, every other day, every three days, every five days, etc.) The computer system can also perform the process 1100 after receiving an indication from a client computing device that user input was received indicating creation or modification of segment criteria. Thus, the computer system can perform the process 1100 to identify segments in the website based on the segment criteria.

In some implementations, one or more blocks in the process 1100 can also be performed as part of training a machine learning model to identify segments across the website. In yet some implementations, one or more blocks of the process 1100 can be performed by the machine learning model during runtime use.

In brief, the process 1100 can be performed to identify DOM nodes for webpages of the website having snippets of text that occur across many different webpages. These DOM nodes are assumed to be template features in the webpage, such as headers, footers, or metadata. The computer system can identify only DOM nodes that are addressable, or otherwise can be matched with a function that matches, at most, one element on each webpage. The identified DOM nodes can be grouped into segments if those nodes have overlapping segment identifiers (e.g., addresses). The computer system can then heuristically categorize the segments into one or more predefined groups. As described herein, the predefined groups can include a header category, a footer category, a metadata category, and a page content category.

The process 1100 can be performed by the computer system 102. The process 1100 can also be performed by one or more other computing systems, devices, computers, networks, cloud-based systems, and/or cloud-based services. For illustrative purposes, the process 1100 is described from the perspective of a computer system.

Referring to the process 1100 in both FIGS. 11A-B, the computer system can retrieve one or more DOMs from a website (block 1102). The DOMs can be tree representations of the HTML for a particular webpage. Therefore, the DOMs can include HTML structure for webpages of the website. In some implementations, the computer system may also retrieve additional information for the webpages of the website, such as JavaScript and CSS.

The computer system can then determine shingle data based on analyzing the DOM(s) in block 1104. Shingle data can be determined by separating a DOM object into smaller fixed size data portions to ensure that the smaller portions of data within webpage information can be compared between documents. For example, the computer system can process a rendered DOM object to break the rendered DOM object into consistent fixed-size data portions that can be compared between webpages. The consistent fixed-size data portions can be shingles of the DOM object. Analyzing the DOM(s) can include generating a mapping of shingle to a count of DOMs that the shingle is identified in (block 1106). The computer system can maintain a mapping S from shingle to number of DOMs having that shingle.

Analyzing the DOM(s) can also include updating the shingle-count mapping based on identifying, for each DOM, nodes containing text and then extracting the shingles from the nodes (block 1108). In other words, the computer system can identify all nodes in the DOMs that contain text. The computer system can merge small, adjacent sibling text-containing nodes into single nodes. The computer system can perform n-shingling, which can include splitting a text into overlapping windows of n-words (e.g., n-grams). Then the computer system can extract shingles form the found text nodes (including the single nodes that comprise merged nodes). The mapping S can be updated with the extracted shingles. As an example, if a shingle is found once in a webpage, that shingle's count in the mapping S can be increased by 1. As another example, if the shingle is found multiple times on the same webpage, then that shingle's count in the mapping S may also increase by one to avoid inaccurate quantification of the shingles in the mapping S.

Next, the computer system can determine segment identifier data based on analyzing the DOM(s) in block 1110. For example, in block 1112, the computer system can generate a mapping of segment identifiers (IDs) to a count of DOMs having the segment ID. In block 1114, the computer system can identify, for each DOM, frequent nodes based on frequency of the node's shingles in the shingle-count mapping. Moreover, in block 1116, the computer system can update the segment ID-count mapping with segment IDs of the frequent nodes.

The segment ID can be a structure users to locate a segment in a webpage. An example segment ID can be "<HTML attribute>=<value>pair." Another example segment ID can be a CSS selector. The segment ID can identify zero or one node on a webpage.

The computer system can maintain a mapping I from segment ID to number of DOMs having the segment ID. For each node, the computer system can identify frequent nodes based on the frequency of those nodes' shingles. The computer system can look up those nodes in the mapping S and compare the values in the mapping S with the number of DOMs having the segment ID. A node can, for example, be marked as higher in the DOM compared to other nodes as reasonable, so as to not split a segment unreasonably. Thus, a header may not be split into multiple segments. As another example, if a node n has children with frequent shingles, and none of those children have rare shingles, then the node n can be identified as a frequent node. This analysis can be repeated for ancestors of the node n. Then, for each identified frequent node, mapping I can be updated with that node's segment identifier(s).

The computer system can also clean the segment ID-count mapping in block 1118. For example, if any segment ID in the mapping I is found more than once on any webpage of the website, that segment ID can be removed from the mapping I. After all, a segment ID should point to zero or one element on every webpage of the website. As an example, if any webpage has two elements with "class='cls'," then "class='cls'" may not be a good segment ID. Cleaning the mapping can also include removing, from the mapping, any segment ID with a count that is below some predetermined threshold value. The predetermined threshold value can be based on a total number of DOMs for the website. In some implementations, the threshold value can be 5%. Thus, any count that is less than 5% means that the segment ID is not present on at least 5% of the webpages of the website. The predetermined threshold value can be uniquely and dynamically defined based on a particular website and/or preferences of the website owner or other relevant user.

The computer system can then determine segments in block 1120. The computer system can maintain the determined segments in a set of segments. The computer system can select a frequent node (block 1122). The computer system can determine whether a segment ID frequency of the frequent node is greater than a threshold value (block 1124). If the frequency exceeds the threshold value, the computer system can proceed to block 1126. In block 1126, the computer system can identify the frequent node as part of a segment. The computer system can then add the segment to a list of segments (e.g., set of segments) in block 1128. Then the computer system can proceed to block 1130.

In other words, for each DOM and for each node that was identified as a frequent node in the DOM, the computer system can determine whether the frequency of any segment ID of that node is higher than the threshold value. The threshold value can be predetermined and based on a particular website and/or preferences of the website owner or other relevant user. In some implementations, the threshold value can be the same for multiple websites and/or across all websites and website owners that use the services provided by the web analysis server system 102. If the frequency exceeds the threshold value, then the node is part of a segment and can be added to the list or set of segments.

If the list or set of segments already contains a segment with at least one of the same segment IDs as the frequent node that was identified as a segment, then the segment ID for the frequent node can be added to that segment in the set of segments. After all, if any of the segment IDs match that of the frequent node, then the frequent node's subtree belongs to that existing segment in the set of segments. Otherwise, the computer system can simply add a new segment to the set of segments with the segment ID or IDs of the frequent node.

Referring back to block 1124, if the segment ID frequency of the frequent node is less than the threshold value, then the computer system can proceed to block 1130. In other words, the frequent node is not likely to be a segment and therefore is not designated as one.

In block 1130, the computer system can determine whether there are more frequent nodes to assess. If there are more nodes, then the computer system can return to block 1122 and repeat blocks 1124-1128 for each remaining frequent node. If there are no more nodes, then the computer system can proceed to block 1132.

In block 1132, the computer system can determine a category for each segment in the list of segments. The computer system can use one or more rules and/or heuristics to identify the segment categories. For example, using classification techniques, the computer system can automatically classify segments using known categories, such as "Header," "Footer," "Metadata," and "Unknown." "Unknown" can be assigned to one or more segments that do not fit into "Header", "Footer," or "Metadata" categories. One or more other categories can be supported, including but not limited to "SoMe," "Sidebar," "Breadcrumbs," "Contact," etc. One or more other categories can also be defined, by the computer system and/or by the website owner, and thus used to classify segments.

The categories can be used for filtering information presented to the website owner about the website. In other words, issues that are identified in the website can be presented to the website owner based on segment category. All issues that were identified in "Header" segments can thus be outputted and displayed in a GUI at the client computing device of the website owner. Issues that were identified in "Footer," "Metadata," or "Unknown" segments, on the other hand, may not be outputted or displayed in the GUI. The website owner can toggle between one or more selectable options to filter what information is presented based on segment category.

The computer system can then return the list of segments based on category in block 1134. As described herein, the list of segments can be presented to the website owner in one or more GUI displays at the client computing device. The list of segments can also be returned with information associated with each of the segments in the list. For example, the information can include issues that have been identified in any one or more of the segments. Refer to FIG. 100 for additional discussion. In some implementations, the list of segments can be returned in a GUI display that is presented to the website owner that can be used to edit, create, modify, or delete segment criteria. Refer to FIGS. 6-9 for additional discussion.

Figure 12:
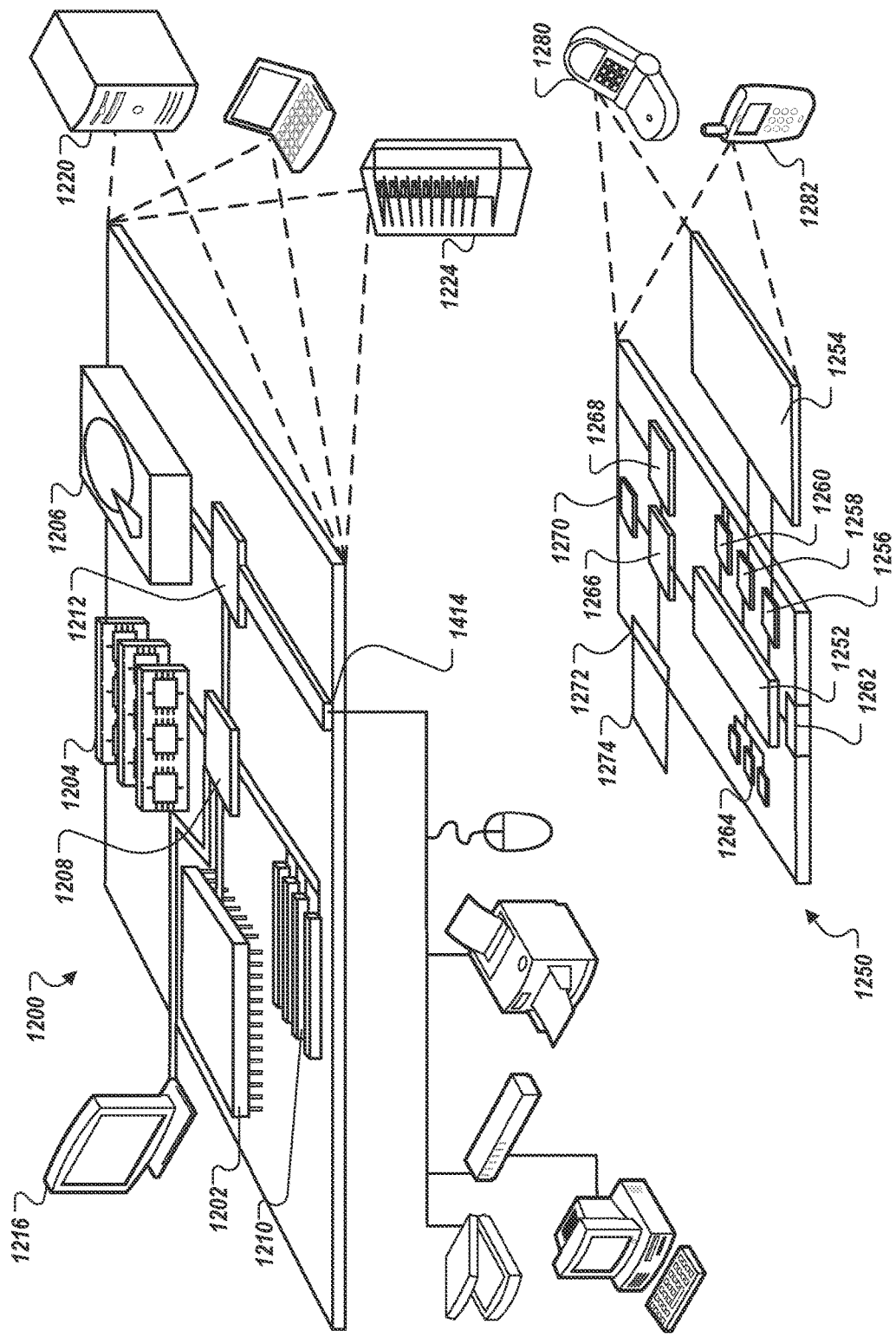
FIG. 12 is a schematic diagram that shows an example of a computing device and a mobile computing device.

FIG. 12 shows an example of a computing device 1200 and an example of a mobile computing device that can be used to implement the techniques described here. The computing device 1200 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1200 includes a processor 1202, a memory 1204, a storage device 1206, a high-speed interface 1208 connecting to the memory 1204 and multiple high-speed expansion ports 1210, and a low-speed interface 1212 connecting to a low-speed expansion port 1214 and the storage device 1206. Each of the processor 1202, the memory 1204, the storage device 1206, the high-speed interface 1208, the high-speed expansion ports 1210, and the low-speed interface 1212, are interconnected using various busses, and can be mounted on a common motherboard or in other manners as appropriate. The processor 1202 can process instructions for execution within the computing device 1200, including instructions stored in the memory 1204 or on the storage device 1206 to display graphical information for a GUI on an external input/output device, such as a display 1216 coupled to the high-speed interface 1208. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1204 stores information within the computing device 1200. In some implementations, the memory 1204 is a volatile memory unit or units. In some implementations, the memory 1204 is a non-volatile memory unit or units. The memory 1204 can also be another form of computer-readable medium, such as a magnetic or optical disk.

The storage device 1206 is capable of providing mass storage for the computing device 1200. In some implementations, the storage device 1206 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1204, the storage device 1206, or memory on the processor 1202.

The high-speed interface 1208 manages bandwidth-intensive operations for the computing device 1200, while the low-speed interface 1212 manages lower bandwidth-intensive operations. Such allocation of functions is exemplary only. In some implementations, the high-speed interface 1208 is coupled to the memory 1204, the display 1216 (e.g., through a graphics processor or accelerator), and to the high-speed expansion ports 1210, which can accept various expansion cards (not shown). In the implementation, the low-speed interface 1212 is coupled to the storage device 1206 and the low-speed expansion port 1214. The low-speed expansion port 1214, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1200 can be implemented in a number of different forms, as shown in the figure. For example, it can be implemented as a standard server 1220, or multiple times in a group of such servers. In addition, it can be implemented in a personal computer such as a laptop computer 1222. It can also be implemented as part of a rack server system 1224. Alternatively, components from the computing device 1200 can be combined with other components in a mobile device (not shown), such as a mobile computing device 1250. Each of such devices can contain one or more of the computing device 1200 and the mobile computing device 1250, and an entire system can be made up of multiple computing devices communicating with each other.

The mobile computing device 1250 includes a processor 1252, a memory 1264, an input/output device such as a display 1254, a communication interface 1266, and a transceiver 1268, among other components. The mobile computing device 1250 can also be provided with a storage device, such as a micro-drive or other device, to provide additional storage. Each of the processor 1252, the memory 1264, the display 1254, the communication interface 1266, and the transceiver 1268, are interconnected using various buses, and several of the components can be mounted on a common motherboard or in other manners as appropriate.

The processor 1252 can execute instructions within the mobile computing device 1250, including instructions stored in the memory 1264. The processor 1252 can be implemented as a chipset of chips that include separate and multiple analog and digital processors. The processor 1252 can provide, for example, for coordination of the other components of the mobile computing device 1250, such as control of user interfaces, applications run by the mobile computing device 1250, and wireless communication by the mobile computing device 1250.

The processor 1252 can communicate with a user through a control interface 1258 and a display interface 1256 coupled to the display 1254. The display 1254 can be, for example, a TFT (Thin-Film-Transistor Liquid Crystal Display) display or an OLED (Organic Light Emitting Diode) display, or other appropriate display technology. The display interface 1256 can comprise appropriate circuitry for driving the display 1254 to present graphical and other information to a user. The control interface 1258 can receive commands from a user and convert them for submission to the processor 1252. In addition, an external interface 1262 can provide communication with the processor 1252, so as to enable near area communication of the mobile computing device 1250 with other devices. The external interface 1262 can provide, for example, for wired communication in some implementations, or for wireless communication in other implementations, and multiple interfaces can also be used.

The memory 1264 stores information within the mobile computing device 1250. The memory 1264 can be implemented as one or more of a computer-readable medium or media, a volatile memory unit or units, or a non-volatile memory unit or units. An expansion memory 1274 can also be provided and connected to the mobile computing device 1250 through an expansion interface 1272, which can include, for example, a SIMM (Single In Line Memory Module) card interface. The expansion memory 1274 can provide extra storage space for the mobile computing device 1250, or can also store applications or other information for the mobile computing device 1250. Specifically, the expansion memory 1274 can include instructions to carry out or supplement the processes described above, and can include secure information also. Thus, for example, the expansion memory 1274 can be provide as a security module for the mobile computing device 1250, and can be programmed with instructions that permit secure use of the mobile computing device 1250. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1264, the expansion memory 1274, or memory on the processor 1252. In some implementations, the computer program product can be received in a propagated signal, for example, over the transceiver 1268 or the external interface 1262.

The mobile computing device 1250 can communicate wirelessly through the communication interface 1266, which can include digital signal processing circuitry where necessary. The communication interface 1266 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1268 using a radio-frequency. In addition, short-range communication can occur, such as using a Bluetooth, WiFi, or other such transceiver (not shown). In addition, a GPS (Global Positioning System) receiver module 1270 can provide additional navigation- and location-related wireless data to the mobile computing device 1250, which can be used as appropriate by applications running on the mobile computing device 1250.

The mobile computing device 1250 can also communicate audibly using an audio codec 1260, which can receive spoken information from a user and convert it to usable digital information. The audio codec 1260 can likewise generate audible sound for a user, such as through a speaker, e.g., in a handset of the mobile computing device 1250. Such sound can include sound from voice telephone calls, can include recorded sound (e.g., voice messages, music files, etc.) and can also include sound generated by applications operating on the mobile computing device 1250.

The mobile computing device 1250 can be implemented in a number of different forms, as shown in the figure. For example, it can be implemented as a cellular telephone 1280. It can also be implemented as part of a smart-phone 1282, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for assessing website quality based on automated website analysis, the method comprising:
   identifying, by a computing system, a website to evaluate, wherein the website comprises webpages and the website is associated with a user account;
   retrieving, by the computing system, code for the webpages that the website comprises from one or more web server systems that host the website;
   locally executing and interpreting, by the computing system, the code to render the webpages as they would appear on client computing devices;
   identifying, by the computing system, webpage segment criteria;
   analyzing, by the computing system, the webpages to identify a subset of webpages that include a segment that satisfies the webpage segment criteria, the segment comprising webpage code;
   identifying, by the computing system, a quality issue in the segment that is present in each webpage in the subset of webpages;
   determining, by the computing system, a quantity of times that the quality issue occurs across the subset of webpages; and
   providing, by the computing system, information to a client computing device associated with the user account to cause the client computing device to present an indication of the quality issue and an indication of the quantity of times that the quality issue occurs across the subset of webpages.

2. The method of claim 1, wherein each webpage of the website comprises multiple segments identified by the computing system based on the webpage segment criteria.

3. The method of claim 1, wherein each webpage of the website comprises multiple types of segments.

4. The method of claim 1, further comprising:
   analyzing, by the computing system, the webpages of the website to identify a second subset of webpages that include a second segment that is different from the first segment and that satisfies second webpage segment criteria, the second subset of webpages being different from the subset of web pages; and
   identifying, by the computing system, a second quality issue in the second segment that is present in each webpage in the second subset of webpages.

5. The method of claim 1, further comprising providing, by the computing system, information to the client computing device to cause the client computing device to present a selectable option to filter a presentation of quality issues present across webpages of the website to a subset of quality issues that are specific to one or more user-selected categories of segments, from among a collection of user-selectable categories of segments.

6. The method of claim 5, wherein the collection of user-selectable categories of segments includes a headers category, a footers category, and a metadata category.

7. The method of claim 5, further comprising receiving, by the computing system, an indication that the client computing device received user input that interacted with the selectable option to select multiple categories of the collection of user-selectable categories of segments.

8. The method of claim 5, further comprising:
receiving, by the computing system, an indication that the client computing device received user input that interacted with the selectable option to select a user-selected category of the collection of user-selectable categories of segments; and
providing, by the computing system responsive to receiving the indication that the client computing device received the user input that interacted with the selectable option to select the user-selected category, information to the client computing device to cause the client computing device to change a user interface of the client computing device from (i) presenting indications of quality issues that are relevant to all webpages of the website, to (ii) presenting only indications of quality issues that are relevant to webpages that include any segment from the user-selected category.

9. The method of claim 8, further comprising:
receiving, by the computing system, an indication that the client computing device received user input that interacted with the selectable option to select, in addition to the user-selected category, a second user-selected category of the collection of user-selectable categories of segments; and
providing, by the computing system responsive to receiving the indication that the client computing device received the user input that interacted with the selectable option to select the second user-selected category, information to the client computing device to cause the client computing device to change the user interface of the client computing device from (i) presenting only indications of quality issues that are relevant to webpages that include any segment from the user-selected category, to (ii) presenting only indications of quality issues that are relevant to webpages that include segments within the user-selected category and indications of quality issues that are relevant to webpages that include segments within the second user-selected category.

10. The method of claim 9, wherein:
the segments within the user-selected category are present across a first subset of webpages of the website;
the segments within the second user-selected category are present across a second subset of webpages of the website; and
the first subset of webpages is different from the second subset of webpages.

11. The method of claim 10, wherein the second user-selected category of segments represents content of the webpages of the website that is not specified by webpage segment criteria and that is other than the segments of the user-selected category of segments.

12. The method of claim 1, further comprising providing, by the computing system, information to the client computing device to cause the client computing device to display a graphical user interface (GUI) that presents (i) a particular webpage of the website concurrently with (ii) indications of multiple segments present across the webpages of the website.

13. The method of claim 12, further comprising:
receiving, by the computing system, an indication that the client computing device received user input that interacted with the presentation of the indications of the multiple segments to indicate selection of a user-selected segment of the multiple segments; and
providing, by the computing system, information to the client computing device to cause the client computing device to highlight, in the GUI that presents the particular webpage concurrently with the indications of the multiple segments, a portion of the webpage that corresponds to the user-selected segment of the multiple segments.

14. The method of claim 12, wherein the GUI includes a side panel that is adjacent to the presentation of the particular webpage in the GUI, wherein the side panel includes the indications of the multiple segments present across the webpages of the website and selectable options to generate the webpage segment criteria.

15. The method of claim 14, wherein:
the indications of the multiple segments that are presented as part of the side panel represents segments present across webpages of the website; and
the computing system has identified the particular webpage as including a group of segments that is less than all of the segments present across the webpages of the website, such that some of the segments represented by the indications of the multiple segments that are visually shown in the side panel are not present in the particular webpage.

16. The method of claim 1, further comprising:
receiving, by the computing system, an indication that the client computing device received user input that modified the webpage code of the segment in a manner that addresses the quality issue, wherein the user input that modifies the webpage code of the segment in the manner that addresses the quality issue is specified a single time by user input; and
implementing, by the computing system, the modification to the webpage code of the segment, which was specified the single time by user input, in every webpage in the subset of webpages.

17. A system for assessing website quality based on automated website analysis, the system comprising:
a website analysis server system to assess website quality; and
a client computing device to provide a graphical user interface (GUI) presenting information about website quality as determined by the website analysis server system, the client computing device being configured to:
output the GUI on a display of the client computing device,
the website analysis server system being configured to:
identify the website to evaluate, the website comprising webpages;
retrieve code for the webpages that the website comprises from one or more web server systems that host the website;
locally execute and interpret the code to render the webpages as they would appear on client computing devices;
analyze the webpages to identify segments that satisfy website segment criteria;
add webpages having the segments to a subset of webpages;

identify at least one issue associated with at least one segment in the subset of webpages;

determine a quantity of times that the at least one issue occurs across the subset of webpages; and transmit, to the client computing device, information to be presented in the GUI that includes an indication of the at least one issue and the quantity.

18. The system of claim 17, wherein the at least one segment is identical to the segments across the subset of webpages.

19. The system of claim 17, wherein the at least one segment is similar to the segments across the subset of webpages.

20. The system of claim 17, wherein the segments are each at least one of a header, footer, metadata, and page content.

21. The system of claim 17, wherein the website analysis server system is further configured to:

analyze the webpages to identify second segments in a second subset of webpages, wherein the second segments are different than the segments across the subset of webpages; and identify at least one issue associated with at least one segment in second subset of webpages, wherein the at least one issue in the second subset of webpages is different than the at least one issue in the subset of webpages.

22. The system of claim 7, wherein each webpage in the subset of webpages has the same at least one issue.

23. The system of claim 17, wherein the website analysis server system is further configured to identify a second issue associated with the at least one segment in the subset of webpages, wherein the second issue is different than the at least one issue.

24. The system of claim 17, wherein the website analysis server system is further configured to transmit, to the client computing device, information to cause the client computing device to present an indication of a type of the segments, wherein the type is at least one of a header, a footer, metadata, and page content.

25. The system of claim 17, wherein the website analysis server system is configured to analyze the webpages to identify segments that satisfy the webpage segment criteria based on applying a machine learning model to the webpages, wherein the machine learning model was previously trained to (i) identify similar elements in other webpages and (ii) group the similar elements into segments.

* * * * *